(12) United States Patent
Kanaya et al.

(10) Patent No.: US 11,396,564 B2
(45) Date of Patent: Jul. 26, 2022

(54) ELECTROCONDUCTIVE RESIN COMPOSITION, METHOD FOR MANUFACTURING SAME AND MOLDED ARTICLE OBTAINED THEREFROM

(71) Applicant: MITSUI CHEMICALS, INC., Tokyo (JP)

(72) Inventors: Hirotaka Kanaya, Chiba (JP); Kuniaki Kawabe, Chiba (JP); Yosuke Takahashi, Ichihara (JP); Koji Matsunaga, Yokohama (JP)

(73) Assignee: MITSUI CHEMICALS, INC., Tokyo (JP)

(*) Notice: Subject to any disclaimer, the term of this patent is extended or adjusted under 35 U.S.C. 154(b) by 462 days.

(21) Appl. No.: 16/489,257

(22) PCT Filed: Feb. 23, 2018

(86) PCT No.: PCT/JP2018/006668
§ 371 (c)(1),
(2) Date: Aug. 27, 2019

(87) PCT Pub. No.: WO2018/159483
PCT Pub. Date: Sep. 7, 2018

(65) Prior Publication Data
US 2020/0010588 A1    Jan. 9, 2020

(30) Foreign Application Priority Data

Feb. 28, 2017    (JP) ............... JP2017-037301

(51) Int. Cl.
| | | |
|---|---|---|
| *C08F 210/02* | (2006.01) | |
| *C08F 210/06* | (2006.01) | |
| *C08F 210/16* | (2006.01) | |
| *C08F 8/46* | (2006.01) | |
| *C08F 255/02* | (2006.01) | |
| *C08L 23/30* | (2006.01) | |
| *C08K 3/04* | (2006.01) | |
| *C08K 7/06* | (2006.01) | |

(52) U.S. Cl.
CPC .............. *C08F 210/02* (2013.01); *C08F 8/46* (2013.01); *C08F 210/06* (2013.01); *C08F 210/16* (2013.01); *C08F 255/02* (2013.01); *C08K 3/04* (2013.01); *C08L 23/30* (2013.01); *C08K 7/06* (2013.01); *C08K 2201/001* (2013.01); *C08K 2201/003* (2013.01); *C08K 2201/004* (2013.01); *C08L 2203/20* (2013.01); *C08L 2203/30* (2013.01); *C08L 2205/02* (2013.01); *C08L 2310/00* (2013.01)

(58) Field of Classification Search
CPC .... C08F 210/02; C08F 210/06; C08F 210/16; C08F 8/46; C08F 255/02; C08L 23/30; C08L 2203/20; C08L 2205/02; C08L 2310/00; C08K 7/06; C08K 2201/001; C08K 2201/003; C08K 2201/004; C08K 3/06

See application file for complete search history.

(56) References Cited

U.S. PATENT DOCUMENTS

| | | | |
|---|---|---|---|
| 6,268,437 B1 | 7/2001 | Takesue et al. | |
| 2003/0055154 A1* | 3/2003 | Urata ................. | C08K 7/06 524/495 |
| 2011/0193030 A1 | 8/2011 | Kolditz et al. | |
| 2012/0220728 A1 | 8/2012 | Uekusa et al. | |
| 2017/0260346 A1 | 9/2017 | Hirata et al. | |

FOREIGN PATENT DOCUMENTS

| | | | |
|---|---|---|---|
| JP | H06-009819 A | | 1/1994 |
| JP | H09-279003 | | 10/1997 |
| JP | 2004-083889 | | 3/2004 |
| JP | 2007-056078 A | | 3/2007 |
| JP | 2007056078 A | * | 3/2007 |
| JP | 2007-161743 | | 6/2007 |
| JP | 2007-224175 A | | 9/2007 |
| JP | 2008-038003 A | | 2/2008 |
| JP | 2008-285518 A | | 11/2008 |
| JP | 2008285518 A | * | 11/2008 |
| JP | 2009-144146 A | | 7/2009 |
| JP | 2012-507587 | | 3/2012 |

(Continued)

OTHER PUBLICATIONS

International Searching Authority, "International Search Report," issued in connection with International Patent Application No. PCT/JP2018/006668, dated Apr. 17, 2018.

International Searching Authority, "Written Opinion," issued in connection with International Patent Application No. PCT/JP2018/006668, dated Apr. 17, 2018.

Chemical Sanyo: "Sanyo Chemical Product Outline No. 1—Performance Chemicals for Synthetic Resin & Rubber Industries and Paint, Ink & Pigment Industries-", Mar. 25, 2016, XP0555751362, Retrieved from the Internet: URL: https://www.sanyo-chemical.co.jp/eng/wp/wp-content/uploads/2019/11/no01.pdf, pp. 1-8.

(Continued)

*Primary Examiner* — Robert D Harlan
(74) *Attorney, Agent, or Firm* — Foley & Lardner LLP

(57) ABSTRACT

The purpose of the present invention is to provide an electroconductive resin composition that has excellent electroconductivity and high mechanical strength. The electroconductive resin composition according to the present invention comprises 75-99 parts by mass of a thermoplastic resin (A), 1-25 parts by mass of a carbon material (B), and more than 1 part by mass but not more than 10 parts by mass, per 100 parts by mass of the total amount of the thermoplastic resin (A) and the carbon material (B), of a modified polyolefin wax (C), wherein the carbon material (B) is a granular carbon material having an average grain diameter of 500 nm or less or a fibrous carbon material having an average fiber length of 1000 μm or less.

10 Claims, No Drawings

(56) References Cited

FOREIGN PATENT DOCUMENTS

| JP | 2013-001858 A | 1/2013 |
|---|---|---|
| JP | 5154820 B2 | 2/2013 |
| JP | 2013-209494 | 10/2013 |
| JP | 5558661 B2 | 7/2014 |
| JP | 2015-028187 A | 2/2015 |
| JP | 2016-204482 A | 12/2016 |
| WO | WO-2011/055803 A1 | 5/2011 |
| WO | WO-2016/021479 A1 | 2/2016 |

OTHER PUBLICATIONS

Extended European Search Report dated Dec. 4, 2020 for corresponding European Patent Application No. 18761333.6.
Notice of Submission of Publications dated Jul. 15, 2020 for corresponding Japanese Patent Application No. 2019-502958.
Submission of Publications dated Jul. 14, 2020 for corresponding Japanese Patent Application No. 2019-502958.

\* cited by examiner

ELECTROCONDUCTIVE RESIN COMPOSITION, METHOD FOR MANUFACTURING SAME AND MOLDED ARTICLE OBTAINED THEREFROM

RELATED APPLICATIONS

The present application claims priority under 37 U.S.C. § 371 to International Patent Application No. PCT/JP2018/006668, filed Feb. 23, 2018, which claims priority to and the benefit of Japanese Patent Application No. 2017-037301, filed on Feb. 28, 2017. The contents of these applications are hereby incorporated by reference in their entireties.

TECHNICAL FIELD

The present invention relates to an electrically conductive resin composition including a modified polyolefin wax and a carbon material, achieving both electrical conductivity and mechanical strength, as well as a method of producing the same and a molded product obtained therefrom.

BACKGROUND ART

Thermoplastic resins are utilized in a wide variety of fields such as automotive components, electrical/electronic components and structural materials due to their characteristics such as an excellent mechanical strength, heat resistance and moldability. However, since many thermoplastic resins have insulation properties, it is essential to combine them with a material having electrical conductivity in order to impart electrical conductivity thereto. Examples of electrically conductive materials include, for example, metal powder, metal fibers and carbon materials, and in recent years, various carbon materials have been developed and put into practical use, making much of weight reduction during use. Examples of carbon materials include, for example, carbon black and graphite, and they are combined with a thermoplastic resin by forced kneading and dispersion with an extruding machine or a kneading machine such as a kneader.

For example, Patent Literatures 1 and 2 disclose electrically conductive polycarbonate resin compositions including a polycarbonate resin, carbon black and an acid-modified polyolefin wax. Patent Literature 3 discloses an electrically conductive composition including a polypropylene resin, carbon black and a polypropylene wax. Patent Literature 4 discloses an electrically semiconductive resin composition including a base resin including an ethylene-vinyl acetate copolymer and nitrile butadiene rubber, carbon black and a polyethylene wax.

CITATION LIST

Patent Literature

PTL 1
Japanese Patent No. 5154820
PTL 2
Japanese Patent No. 5558661
PTL 3
Japanese Patent Application Laid-Open No. 2007-224175
PTL 4
Japanese Patent Application Laid-Open No. 2013-1858

SUMMARY OF INVENTION

Technical Problem

However, the forced kneading and dispersion upon combining a thermoplastic resin and a carbon material brings about destruction of the carbon material or aggregated particle structure of the carbon material, and therefore, the electrical conductivity as expected has often not been achieved. In order to cope with the above, the amount of the carbon material is increased, but this also leads to reduction of the mechanical strength of a molded product, which has made it difficult to achieve both electrical conductivity and mechanical strength.

In Patent Literatures 1 and 2, it is not suggested that by at least adding the acid-modified polyolefin wax to a mixture of the polycarbonate resin and carbon black, both electrical conductivity and mechanical strength can be achieved. The electrically conductive composition in Patent Literature 3 includes an unmodified polypropylene wax and this wax does not have a sufficient affinity for carbon black, which made it difficult to obtain a molded product that has a sufficient electrical conductivity and mechanical strength. The electrically semiconductive resin composition in Patent Literature 4 has a high content of carbon black, which made it difficult to obtain a molded product that has a sufficient mechanical strength.

The present invention is established in view of such circumstances, and an object thereof is to provide an electrically conductive resin composition achieving both electrical conductivity and mechanical strength.

Solution to Problem

From the above, the present inventors have found that by including a modified polyolefin wax (C) as a dispersing agent for a carbon material (B), an electrically conductive resin composition achieving both electrical conductivity and mechanical strength can be obtained. That is, the present invention relates to the following [1] to [11].

[1] An electrically conductive resin composition, comprising 75 to 99 parts by mass of a thermoplastic resin (A) and 1 to 25 parts by mass of a carbon material (B), and also comprising more than 1 part by mass and 10 parts by mass or less of a modified polyolefin wax (C) based on 100 parts by mass of the total of the thermoplastic resin (A) and the carbon material (B), wherein the carbon material (B) is a particulate carbon material having an average particle diameter of 500 nm or less or a fibrous carbon material having an average length of 1,000 µm or less.

[2] The electrically conductive resin composition according to [1], wherein the modified polyolefin wax (C) satisfies the following (iii):

(iii) a softening point measured in accordance with JIS K2207 ranges from 70 to 170° C.

[3] The electrically conductive resin composition according to [1] or [2], wherein the modified polyolefin wax (C) is a maleic anhydride-modified product, an air oxidation product or a styrene-modified product of a copolymer of ethylene and at least one α-olefin selected from $C_{3-12}$ α-olefins.

[4] The electrically conductive resin composition according to any one of [1] to [3], wherein the modified polyolefin wax (C) is a maleic anhydride-modified product or an air oxidation product of the copolymer, and wherein an acid number of the modified polyolefin wax (C) ranges from 1 to 100 mgKOH/g.

[5] The electrically conductive resin composition according to any one of [1] to [4] 3, wherein the modified polyolefin wax (C) is a styrene-modified product of the copolymer, and wherein a styrene amount of the modified polyolefin wax (C) ranges between 5 and 80 mass %.

[6] The electrically conductive resin composition according to any one of [1] to [5], wherein a dibutyl phthalate oil absorption of the carbon material (B) is 100 ml/100 g to 1,000 ml/100 g.

[7] The electrically conductive resin composition according to any one of [1] to [6], wherein the thermoplastic resin (A) is an ethylene (co)polymer or a propylene (co)polymer.

[8] The electrically conductive resin composition according to any one of [1] to [6], wherein the thermoplastic resin (A) is a polycarbonate resin.

[9] A method of producing the electrically conductive resin composition according to any one of [1] to [8], comprising:

providing a masterbatch comprising the thermoplastic resin (A), the carbon material (B) and the modified polyolefin wax (C); and melt kneading the masterbatch and the thermoplastic resin (A)

[10] A molded product obtained from the electrically conductive resin composition according to any one of [1] to [8].

[11] The molded product according to [10], wherein the molded product is an electromagnetic wave shielding member for OA equipment.

Advantageous Effects of Invention

According to the present invention, an electrically conductive resin composition achieving both electrical conductivity and mechanical strength can be provided.

DESCRIPTION OF EMBODIMENTS

Hereinafter, the present invention will be described specifically. Note that, unless otherwise noted, "x to y" indicating a numerical range refers to x or more and y or less in the following description.

1. Electrically Conductive Resin Composition

An electrically conductive resin composition of the present invention contains a thermoplastic resin (A), a carbon material (B) and a modified polyolefin wax (C).

When the total of the thermoplastic resin (A) and the carbon material (B) in the electrically conductive resin composition of the present invention is set to be 100 parts by mass, the amount of the thermoplastic resin (A) is 75 to 99 parts by mass, preferably 80 to 98 parts by mass, and more preferably 85 to 97 parts by mass. In order to achieve a high mechanical strength, it is preferable to increase the amount of the thermoplastic resin (A). The lower limit of the thermoplastic resin (A) for achieving a high mechanical strength is preferably 90 parts by mass, preferably 93 parts by mass, and more preferably 95 parts by mass.

When the total of the thermoplastic resin (A) and the carbon material (B) in the electrically conductive resin composition of the present invention is set to be 100 parts by mass, the amount of the carbon material (B) is 1 to 25 parts by mass, preferably 2 to 20 parts by mass, and more preferably 3 to 15 parts by mass. When the carbon material (B) is included in an amount of the lower limit mentioned above or more relative to the content of the thermoplastic resin (A), the electrically conductive resin composition to be obtained will have an excellent electrical conductivity, and when the carbon material (B) is included in an amount of the upper limit mentioned above or less, the electrically conductive resin composition to be obtained will have an excellent mechanical strength. In order to achieve a high electrical conductivity, that is, a low volume resistivity value, it is preferable to increase the amount of the carbon material (B). The lower limit of the carbon material (B) for achieving a high electrical conductivity is 5 parts by mass, preferably 7 parts by mass, and more preferably 9 parts by mass.

When the total of the thermoplastic resin (A) and the carbon material (B) in the electrically conductive resin composition of the present invention is set to be 100 parts by mass, the amount of the modified polyolefin wax (C) is more than 1 part by mass and 10 parts by mass or less, preferably 1.5 to 8 parts by mass, and more preferably 2 to 5 parts by mass. When the modified polyolefin wax (C) is included in an amount of the lower limit mentioned above or more, the resin composition to be obtained will have an excellent electrical conductivity and mechanical strength, and when the modified polyolefin wax (C) is included in an amount of the upper limit mentioned above or less, the properties that the thermoplastic resin (A) inherently has will be maintained and the electrically conductive resin composition to be obtained will have an excellent mechanical strength, which are preferable.

The electrical conductivity of the electrically conductive resin composition of the present invention can be evaluated with a volume resistivity value measured in accordance with ASTM D257 (guarded-electrode system) or JIS K7194 (four-probe method), and be set at various volume resistivity values depending on the application. Note that, in general, measurement with ASTM D257 (guarded-electrode system) is suitable for a high resistance region of $1.0 \times 10^6$ Ω·cm or higher, and measurement with JIS K7194 (four-probe method) is suitable for a resistance region of less than $1.0 \times 10^6$ Ω·cm. For example, when the electrically conductive resin composition of the present invention is used as a packaging material for semiconductor products such as an IC tray, a silicon wafer case and a carrier tape, it is preferable that the volume resistivity value of the electrically conductive resin composition of the present invention be $1.0 \times 10^6$ to $1.0 \times 10^9$ Ω·cm. Moreover, when the electrically conductive resin composition of the present invention is used as a floor material for a clean room, a belt conveyor, a light electrical member for OA equipment or a base material for electrostatic coating, it is preferable that the volume resistivity value of the electrically conductive resin composition of the present invention be $1.0 \times 10^2$ to $1.0 \times 10^7$ Ω·cm. Furthermore, when the electrically conductive resin composition of the present invention is used as an electromagnetic wave shielding member for OA equipment, it is preferable that the volume resistivity value of the electrically conductive resin composition of the present invention be $1.0 \times 10^{-1}$ to $1.0 \times 10^4$ Ω·cm. The volume resistivity value of the electrically conductive resin composition may be adjusted depending on, for example, types or contents of the carbon material (B) and the modified polyolefin wax (C).

The bending elastic modulus of the electrically conductive resin composition of the present invention, measured in accordance with JIS K7171 (ISO 178), preferably ranges between 100 and 400%, more preferably between 100 and 300%, and further preferably between 100 and 250% relative to the bending elastic modulus of the thermoplastic resin (A) constituting the electrically conductive resin composition. When the bending elastic modulus of the electrically conductive resin composition of the present invention is within the range described above, reduction of the bending elastic modulus of the electrically conductive resin composition due to addition of the carbon material (B) is small, which is preferable. The bending elastic modulus of the electrically conductive resin composition may be adjusted depending on the composition of the electrically conductive resin composition (in particular, the type of the thermoplastic resin (A), the content of the carbon material (B), or the like).

Hereinafter, each component and each requirement will be described.

1-1. Thermoplastic Resin (A)

1-1-1. Type of Thermoplastic Resin (A)

Representative examples of the thermoplastic resin (A) include the following (1) to (16). One of these may be used singly, or two or more of them may be used in combination:

(1) olefin polymers;
(2) polyamides;
(3) polyesters;
(4) polyacetals;
(5) styrene resins such as polystyrene, acrylonitrile-butadiene-styrene resins, acrylonitrile-acrylic rubber-styrene resins, acrylonitrile-ethylene rubber-styrene resins, (meth)acrylic acid ester-styrene resins and styrene-butadiene-styrene resins;
(6) acrylic resins such as polymethyl methacrylate and polyethyl methacrylate;
(7) polycarbonates;
(8) polyphenylene oxide;
(9) chlorine-containing resins such as polyvinyl chloride and polyvinylidene chloride;
(10) vinyl acetate resins such as polyvinyl acetate and ethylene-vinyl acetate resins;
(11) ethylene-(meth)acrylic acid ester copolymers;
(12) ethylene-acrylic acid resins, ethylene-methacrylic acid resins and ionomer resins thereof;
(13) vinyl alcohol resins such as polyvinyl alcohol and ethylene-vinyl alcohol resins;
(14) cellulose resins;
(15) thermoplastic elastomers such as vinyl chloride elastomers, urethane elastomers and polyester elastomers; and
(16) various copolymerized rubbers.

Next, specific examples will be mentioned for each thermoplastic resin.

(1) Olefin Polymers

Examples of the olefin polymers can include olefin homopolymers such as polyethylene, polypropylene, poly(1-butene), poly(4-methyl-1-pentene) and polymethylbutene; and olefin copolymers such as an ethylene-α-olefin random copolymer, propylene-ethylene random copolymer, ethylene-α-olefin-nonconjugated polyene copolymer, and 4-methyl-1-pentene-α-olefin copolymer.

The olefin polymer can be, for example, an ethylene (co)polymer. The ethylene (co)polymer is preferably an ethylene homopolymer or a copolymer of ethylene and a $C_{3-12}$ α-olefin. Specific examples of the ethylene homopolymer and copolymer include ultra-high molecular weight polyethylene, high density polyethylene, medium density polyethylene, low density polyethylene and linear low density polyethylene.

On the other hand, when the ethylene (co)polymer is a copolymer of ethylene and a $C_{3-12}$ α-olefin, the amount of structural units derived from ethylene (a) is preferably 91.0 to 99.9 mol %, more preferably 93.0 to 99.9 mol %, further preferably 95.0 to 99.9 mol %, and particularly preferably 95.0 to 99.0 mol %. Meanwhile, the amount of structural units derived from the α-olefin having 3 or more carbon atoms (b) is preferably 0.1 to 9.0 mol %, more preferably 0.1 to 7.0 mol %, further preferably 0.1 to 5.0 mol %, and particularly preferably 1.0 to 5.0 mol %. Note that (a)+(b)=100 mol %. The content ratio of structural units in the olefin polymer described above can be determined through analysis of the $^{13}$C-NMR spectrum.

Here, examples of the $C_{3-12}$ α-olefin include linear or branched α-olefins such as propylene, 1-butene, 1-pentene, 3-methyl-1-butene, 1-hexene, 4-methyl-1-pentene, 3-methyl-1-pentene, 1-octene, 1-decene and 1-dodecene. It is preferably propylene, 1-butene, 1-hexene, 4-methyl-1-pentene or 1-octene, further preferably a $C_{3-8}$ α-olefin, and particularly preferably propylene or 1-butene. When ethylene and propylene or 1-butene are copolymerized, balance among the processability, appearance and mechanical strength of the electrically conductive resin composition becomes satisfactory. Note that one α-olefin may be used singly, or two or more α-olefins may be used in combination.

The MFR of the ethylene (co)polymer, measured in accordance with ISO 1133 at 190° C. and with a load of 2.16 kg, is preferably 0.01 to 500 g/10 min and more preferably 0.1 to 100 g/10 min. When the MFR of the ethylene (co)polymer is within the range described above, the flowability upon molding is good and a molded product with a satisfactory mechanical strength is likely to be obtained.

Furthermore, the olefin polymer may be a propylene homopolymer (polypropylene) or a propylene (co)polymer between propylene and ethylene or a $C_{4-12}$ α-olefin. When the propylene (co)polymer is a copolymer of propylene and ethylene, the amount of structural units derived from propylene may be 60 to 99.5 mol %. In this case, the amount of structural units derived from propylene is preferably 80 to 99 mol %, more preferably 90 to 98.5 mol %, and further preferably 95 to 98 mol %. Note that the total of the amount of structural units derived from propylene and the amount of structural units derived from ethylene is 100 mol %. When a propylene (co)polymer with a large amount of structural units derived from propylene is used, balance among the heat resistance, appearance and mechanical strength of the electrically conductive resin composition becomes satisfactory.

When the propylene (co)polymer is a copolymer of propylene and a $C_{4-12}$ α-olefin, examples of the $C_{4-12}$ α-olefin include linear or branched α-olefins such as 1-butene, 1-pentene, 3-methyl-1-butene, 1-hexene, 4-methyl-1-pentene, 3-methyl-1-pentene, 1-octene, 1-decene and 1-dodecene. Among these, 1-butene is particularly preferable. In addition, the propylene-α-olefin copolymer may further include structural units derived from an olefin other than $C_{4-12}$ olefins, and for example, structural units derived from ethylene may be included in a small amount, for example, in an amount of 10 mol % or less. On the other hand, it is also another preferable aspect not to include structural units derived from ethylene from the viewpoint that balance between the heat resistance and mechanical strength of the electrically conductive resin composition is enhanced. One α-olefin may be used singly, or two or more α-olefins may be used in combination.

When the propylene (co)polymer described above is a propylene-α-olefin copolymer, the amount of structural units derived from propylene (a') is preferably 60 to 90 mol %, more preferably 65 to 88 mol %, further preferably 70 to 85 mol %, and particularly preferably 75 to 82 mol %. Meanwhile, the amount of structural units derived from the α-olefin having 4 or more carbon atoms (b') is preferably 10 to 40 mol %, more preferably 12 to 35 mol %, further preferably 15 to 30 mol %, and particularly preferably 18 to 25 mol %. Note that (a')+(b')=100 mol %.

When the composition of the propylene-α-olefin copolymer is within the range described above, an electrically conductive resin composition with an excellent appearance can be obtained. The reason behind this is not clear, but it is believed that since the crystallization rate is slow, the electrically conductive resin composition can flow for a longer time in a metal mold or during a cooling step, and as a result, the surface properties become satisfactory. In addition, when the composition is within the range described above, the mechanical strength and heat resistance become satisfactory. The melting point, Tm, of the propylene-α-olefin copolymer obtained from the result of DSC is normally 60 to 120° C., preferably 65 to 100° C., and further preferably 70 to 90° C.

Still furthermore, the olefin polymer may be an ethylene-α-olefin-nonconjugated polyene copolymer. In this case, the copolymer is preferably a copolymer of ethylene [A], a $C_{3-12}$ α-olefin [B] and a nonconjugated polyene [C], and more preferably a polymer in which these are copolymerized randomly. Examples of the α-olefin include $C_{3-12}$ α-olefins, and a linear or branched $C_{3-12}$ α-olefin such as propylene, 1-butene, 1-pentene, 3-methyl-1-butene, 1-hexene, 4-methyl-1-pentene, 3-methyl-1-pentene, 1-octene, 1-decene and 1-dodecene is used. For the nonconjugated polyene, a cyclic or chain nonconjugated polyene is used. Examples of the cyclic nonconjugated polyene include, for example, cyclopentene, cycloheptene, norbornene, 5-ethylidene-2-norbornene, dicyclopentadiene, 5-vinyl-2-norbornene, norbornadiene, methyltetrahydroindene and tetracyclododecene. Examples of the chain nonconjugated polyene include, for example, 1,4-hexadiene, 7-methyl-1,6-octadiene, 4-ethylidene-8-methyl-1,7-nonadiene and 4-ethylidene-1,7-undecadiene. Among these, 5-ethylidene-2-norbornene, dicyclopentadiene and 5-vinyl-2-norbornene are preferable. One of these cyclic or chain nonconjugated polyenes may be used singly, or two or more of them may be used in combination.

Examples of the ethylene-α-olefin-nonconjugated polyene random copolymer include an ethylene-propylene-diene terpolymer (EPDM).

Moreover, for the olefin polymer, a propylene-α-olefin-nonconjugated polyene copolymer, 1-butene-α-olefin-nonconjugated polyene copolymer or the like can be used.

Furthermore, for the olefin polymer, a 4-methyl-1-pentene-α-olefin copolymer can be used. Specific examples of the 4-methyl-1-pentene-α-olefin copolymer include, for example, a polymer disclosed in WO2011/055803. The amount of structural units derived from 4-methyl-1-pentene in the 4-methyl-1-pentene-α-olefin copolymer is preferably 5 to 95 mol %, and the amount of structural units derived from at least one or more α-olefins selected from $C_{2-20}$ α-olefins other than 4-methyl-1-pentene is preferably 5 to 95 mol %. In addition, in a part of the 4-methyl-1-pentene-α-olefin copolymer, a nonconjugated polyene may be included, and the amount of structural units derived from the nonconjugated polyene is preferably 0 to 10 mol %. The total amount of these structural units is 100 mol %.

Note that there is no particular limitation on the tacticity of the olefin polymer, but when the olefin polymer is a propylene (co)polymer, it is preferable that the propylene (co)polymer have a substantially syndiotactic structure. For example, when the propylene (co)polymer has a substantially syndiotactic structure, the molecular weight between entanglement points (Me) becomes smaller and the number of entanglements in the molecule becomes larger at the same molecular weight. Therefore, the melt tension becomes larger and dripping becomes unlikely to occur. Moreover, when a molded product is produced using an electrically conductive resin composition including the propylene (co)polymer, the composition is likely to properly adhere to a metal mold for molding or a roller. Furthermore, when compared to a general isotactic polypropylene (co)polymer, the propylene (co)polymer having syndiotactic structure has a slower crystallization rate and thus cooling at a metal mold or on a roller becomes slower, thereby elevating the adhesiveness. As a result, it is assumed that the glossiness of the surface of the molded product is enhanced, and that the abrasion resistance, scratch resistance, impact resistance or the like is enhanced. Note that when the propylene (co)polymer has a substantially syndiotactic structure, this means a peak area corresponding to 19.5 to 20.3 ppm in the $^{13}$C-NMR spectrum accounts for 0.5% or more relative to the entire peak areas detected. When the syndiotacticity is within the range described above, the crystallization rate becomes slower to an extent where molding is possible and the processability becomes very satisfactory. In addition, in the propylene (co)polymer in which structural units derived from propylene have a substantially syndiotactic structure, the abrasion resistance and scratch resistance are very satisfactory compared to polyethylene, block polypropylene and isotactic polypropylene, which are general-purpose polyolefin resins. Note that the propylene (co)polymer having a syndiotactic structure can be produced by a variety of known production methods.

<Graft Modification>

When the thermoplastic resin (A) is the olefin polymer described above, from the viewpoint that the shape of the carbon material (B) is likely to be kept upon production of the electrically conductive resin composition and a molded product having an excellent electrical conductivity is likely to be obtained, it is preferable that the olefin polymer be unmodified, which means that it is preferable that the acid number of the thermoplastic resin (A) be less than 1 mgKOH/g and the styrene amount be 5 mass % or less. On the other hand, from the viewpoint that an electrically conductive resin composition having an excellent heat resistance and mechanical strength is likely to be obtained, the olefin polymer may be graft-modified with a polar compound including a double bond. When the olefin polymer is graft-modified, the affinity between the thermoplastic resin (A) and the carbon material (B) is enhanced, and an electrically conductive resin composition having an excellent heat resistance and mechanical strength is likely to be obtained.

Graft modification of the olefin polymer can be performed by known methods. For example, a method can be exemplified in which the olefin polymer is dissolved in an organic solvent; to the resulting solution, a polar compound including a double bond such as unsaturated carboxylic acid and a radical initiator are added; and the reaction is allowed at a temperature of normally 60 to 350° C., preferably 80 to 190° C. for 0.5 to 15 hours, preferably 1 to 10 hours.

For the organic solvent described above, any organic solvent can be used without particular limitations as long as it can dissolve the olefin polymer. Examples of such an organic solvent include aromatic hydrocarbon solvents such as benzene, toluene and xylene; and aliphatic hydrocarbon solvents such as pentane, hexane and heptane.

In addition, as another method for graft modification, a method can be exemplified in which the olefin polymer and a polar compound including a double bond such as unsaturated carboxylic acid are allowed to react using an extruding machine, preferably without using any solvent in combination. The reaction conditions in this case can be set such that the reaction temperature is normally the melting point of the olefin polymer or higher, and specifically 100 to 350° C. The reaction time can be normally set as 0.5 to 10 minutes.

In order to efficiently perform the graft copolymerization with a polar compound including a double bond, it is preferable that the reaction be conducted in the presence of a radical initiator.

As the radical initiator, an organic peroxide or an organic perester (for example, benzoyl peroxide, dichlorobenzoyl peroxide, dicumyl peroxide, di-t-butyl peroxide, 2,5-dimethyl-2,5-di(peroxide benzoate)hexyne-3,1,4-bis(t-butylperoxyisopropyl)benzene, lauroyl peroxide, t-butyl peracetate, 2,5-dimethyl-2,5-di(t-butylperoxy)hexyne-3,2,5-dimethyl-2,5-di(t-butylperoxy)hexane, t-butyl perbenzoate, t-butyl perphenylacetate, t-butyl perisobutyrate, t-butyl per-sec-octoate, t-butyl perpivarate, cumyl perpivarate and t-butyl perdiethylacetate), an azo compound (for example, azobisisobutyronitrile and dimethyl azoisobutyrate), or the like is used. Among these, dialkyl peroxides such as dicumyl peroxide, di-t-butyl peroxide, 2,5-dimethyl-2,5-di(t-butylperoxy)hexyne-3,2,5-dimethyl-2,5-di(t-butylperoxy)hexane, and 1,4-bis(t-butylperoxyisopropyl)benzene are preferable. The radical initiator is normally used at a proportion of 0.001 to 1 part by mass relative to 100 parts by mass of the olefin polymer prior to the modification.

Note that the shape of the graft-modified olefin polymer is not particularly limited and it may be, for example, particulate. As an example of methods suitable for obtaining a particulate graft-modified olefin polymer, a method can be exemplified in which particles composed of one or two or more α-olefins selected from $C_{2-18}$ α-olefins and having a melting point of 50° C. or more and less than 250° C., and monomers having an ethylenically unsaturated group and a polar functional group in the same molecule are subjected to graft reaction. The graft reaction can be carried out using the radical initiator mentioned above at a temperature of the melting point (Tm) of the polyolefin particles or less. The average particle diameter of particles of the graft-modified olefin polymer may be, but is not limited to, for example, 0.2 mm to 2.5 mm. In addition, in one of the exemplary aspects of the present invention, the melting point of the polyolefin particles used for the preparation of the particulate graft-modified olefin polymer is 50° C. or more and less than 250° C., but it is not limited to this range. The graft reaction described above can be carried out with no solvent, but it is preferably carried out in the presence of an organic solvent.

<Physical Properties of Olefin Polymer>

The ratio between the weight average molecular weight and the number average molecular weight (Mw/Mn) of the olefin polymer, measured by gel permeation chromatography (GPC), is preferably 6.0 or less. The ratio is more preferably 4.0 or less and further preferably 3.0 or less. When the Mw/Mn is included within the range described above, the amount of low molecular weight components, which cause deterioration of physical properties, is small, thereby achieving an excellent appearance, heat resistance and mechanical strength. Furthermore, the amount of high molecular weight objects, which cause increase in melt viscosity upon kneading, is small, thereby achieving an excellent processability.

It is preferable that the melting point (Tm) of the olefin polymer, measured by a differential scanning calorimetry (DSC), be 250° C. or less, or not observed. When the melting pint is observed, the upper limit of the melting point is more preferably 230° C., further preferably 200° C., and particularly preferably 170° C. In addition, the lower limit of the melting point is preferably 50° C., more preferably 70° C., further preferably 90° C., particularly preferably 130° C., and most preferably 150° C. When the melting point is within the range defined by the upper limit and the lower limit described above, upon production of an electrically conductive resin composition through melt kneading and upon production of a molded object through melt molding, influences on the environment for molding operation such as fuming and odor become small, which is preferable. Moreover, an electrically conductive resin composition with little stickiness and with an excellent balance among the heat resistance, mechanical strength, impact strength and impact absorption can be obtained.

The glass transition temperature (Tg) of the olefin polymer, measured by a differential scanning calorimetry (DSC), is preferably within the range of −140° C. to 50° C., more preferably within the range of −120° C. to 20° C., and further preferably within the range of −100° C. to −10° C. When the glass transition temperature is within the range described above, the electrically conductive resin composition tends to have an excellent balance among the long term stability, heat resistance, impact resistance and mechanical strength.

The density of the olefin polymer, measured in accordance with ISO 1183 and following density gradient tube method, is preferably within the range of 800 to 1,800 kg/m³. The lower limit of the density of the olefin polymer is more preferably 810 kg/m³, further preferably 830 kg/m³, particularly preferably 860 kg/m³, and most preferably 900 kg/m³. In addition, the upper limit of the density of the olefin polymer is more preferably 1,300 kg/m³, further preferably 1,100 kg/m³, particularly preferably 1,000 kg/m³, further preferably 940 kg/m³, and most preferably 905 kg/m³.

The bending elastic modulus of the olefin polymer, measured in accordance with JIS K7171:94 (ISO 178), is preferably 1 to 10,000 MPa. Here, when the bending elastic modulus described above is 500 MPa or more, the bending elastic modulus is preferably 500 to 7,000 MPa, more preferably 700 to 5,000 MPa, particularly preferably 900 to 3,000 MPa, and further preferably 1,000 to 2,000 MPa. When the bending elastic modulus falls within the range described above, an electrically conductive resin composition not only having an excellent processability, but also having an excellent balance among the scratch resistance, heat resistance and mechanical strength can be obtained. In addition, when the bending elastic modulus described above is less than 500 MPa, it is preferably less than 300 MPa, more preferably less than 100 MPa, and further preferably less than 50 MPa. When the bending elastic modulus falls within the range described above, an electrically conductive resin composition not only having an excellent flexibility, but also having an excellent shock absorption, lightness, vibration resistance, damping properties and sound control properties can be obtained. Furthermore, an electrically conductive resin composition having excellent designable properties such as metal mold transferability and grain transferability, and surface gripping properties can be obtained.

(2) Polyamides

Examples of the polyamides can include aliphatic polyamides such as Nylon 6, Nylon 66, Nylon 10, Nylon 11, Nylon 12, Nylon 46, Nylon 66, Nylon 610 and Nylon 612; and aromatic polyamides produced from an aromatic dicarboxylic acid and an aliphatic diamine, and Nylon 6 is preferable.

(3) Polyesters

Examples of polyesters can include aromatic polyesters such as polyethylene terephthalate, polyethylene naphthalate and polybutylene terephthalate; polycaprolacton; polyhydroxybutyrate; and polyester elastomers, and polyethylene terephthalate is preferable.

(4) Polyacetals

Examples of the polyacetals can include polyformaldehyde (polyoxymethylene), polyacetaldehyde, polypropionaldehyde and polybutylaldehyde, and polyformaldehyde is particularly preferable.

(5) Styrene Resins

The styrene resin may be a homopolymer of styrene, or may be a bipolymer of styrene and acrylonitrile, methyl methacrylate, α-methylstyrene or the like, for example, acrylonitrile-styrene copolymer. In addition, it may be an acrylonitrile-butadiene-styrene resin, an acrylonitrile-acrylic rubber-styrene resin, an acrylonitrile-ethylene rubber-styrene resin, a (meth)acrylic acid ester-styrene resin or various styrene elastomers. For the acrylonitrile-butadiene-styrene (ABS) resin, preferably used are those containing structural units derived from acrylonitrile in an amount of 20 to 35 mol %, structural units derived from butadiene in an amount of 20 to 30 mol %, and structural units derived from styrene in an amount of 40 to 60 mol %. The total of these structural units is 100 mol %.

Moreover, for the styrene elastomer, known styrene elastomers having a polystyrene phase as a hard segment may also be used. Specific examples can include styrene-butadiene copolymers (SBR), styrene-isoprene-styrene copolymers (SIS), styrene-butadiene-styrene copolymers (SBS), styrene-ethylene-butadiene-styrene copolymers (SEBS), and their hydrogenated products, styrene-isobutylene-styrene triblock copolymers (SIBS) and styrene-isobutylene diblock copolymers (SIB). Styrene-isobutylene-styrene triblock copolymers (SIBS) and styrene-isobutylene diblock copolymers (SIB) are preferable.

(6) Acrylic Resins

Examples of acrylic resins include polymethacrylate and polyethyl methacrylate, and polymethyl methacrylate (PMMA) is preferable.

(7) Polycarbonates

Examples of polycarbonates can include those obtained from bis(4-hydroxyphenyl)methane, 1,1-bis(4-hydroxyphenyl)ethane, 2,2-bis(4-hydroxyphenyl)propane, 2,2-bis(4-hydroxyphenyl)butane and the like, and a polycarbonate obtained from 2,2-bis(4-hydroxyphenyl)propane is preferable.

The melt volume flow rate (MVR) of the polycarbonate, which is an indicator of the molecular weight, measured by ISO 1133, is preferably 3 to 30 cm$^3$/10 min, more preferably 4 to 25 cm$^3$/10 min, and particularly preferably 5 to 20 cm$^3$/10 min. When the melt volume flow rate (MVR) is within the range described above, the mechanical strength of the molded product to be obtained can be enhanced without impairing moldability.

(8) Polyphenylene Oxide

For polyphenylene oxide, poly(2,6-dimethyl-1,4-phenylene oxide) is preferable.

(9) Chlorine-Containing Resins such as Polyvinyl Chloride and Polyvinylidene Chloride Polyvinyl chloride may be a homopolymer of vinyl chloride, or may be a copolymer of vinyl chloride and vinylidene chloride, acrylic acid ester, acrylonitrile, propylene or the like. On the other hand, polyvinylidene chloride is a resin normally including 85% or more of vinylidene chloride units, and for example, a copolymer of vinylidene chloride and vinyl chloride, acrylonitrile, (meth)acrylic acid ester, allyl ester, unsaturated ether, styrene or the like is used. Furthermore, vinyl chloride elastomers may also be used.

(10) Vinyl Acetate Resins such as Polyvinyl Acetate and Ethylene-Vinyl Acetate Resins Polyvinyl acetate may be a homopolymer of vinyl acetate, or may be a copolymer of vinyl acetate and ethylene or vinyl chloride. Among these, an ethylene-vinyl acetate copolymer is preferable. In addition, modified ethylene-vinyl acetate copolymers such as saponified ethylene-vinyl acetate copolymers and graft-modified ethylene-vinyl acetate copolymers may be used as well.

(11) Ethylene-(Meth)Acrylic Acid Ester Copolymers

For the ethylene-(meth)acrylic acid ester copolymer, ethylene-methyl acrylate copolymers, ethylene-ethyl acrylate copolymers, ethylene-methyl methacrylate copolymers and ethylene-ethyl methacrylate copolymers are preferable.

(12) Ethylene-Acrylic Acid Resins, Ethylene-Methacrylic Acid Resins and Ionomer Resins Thereof The ethylene-acrylic acid copolymer and ethylene-methacrylic acid copolymer may be a copolymer of ethylene and either of acrylic acid or methacrylic acid. These may be further salified with a metal to form a metal salt (ionomer). A metal element of the metal salt is preferably at least one selected from K, Na, Ca and Zn. It is more preferable that the metal element is K, Na, Ca and Zn because modification is readily performed.

(13) Vinyl Alcohol Resins such as Polyvinyl Alcohol and Ethylene-Vinyl Alcohol Resins Examples thereof include polyvinyl alcohol and ethylene-vinyl alcohol resins, and ethylene-vinyl alcohol resins are preferable. The ethylene-vinyl alcohol resin is obtained through hydrolysis of the copolymerized object of ethylene and vinyl acetate. The ethylene-vinyl alcohol resin not only has high gas barrier properties, oil resistance and transparency of polyvinyl alcohol, but also has characteristics of the ethylene component such as moisture resistance and melt extrusion processability in combination.

(14) Cellulose Resins

Representative examples of the cellulose resin include acetyl cellulose. By using a plasticizer such as dibutyl phthalate in combination, it has characteristics of a thermoplastic resin.

(15) Thermoplastic Elastomers

A thermoplastic polyurethane material exemplified as a thermoplastic urethane elastomer will be described. The structure of the thermoplastic polyurethane material consists of a soft segment consisting of polymeric polyol (polymeric glycol) and a hard segment constituted by a chain extender and a diisocyanate. Here, for the polymeric polyol to be a raw material, any of those conventionally used in technologies relating to thermoplastic polyurethane materials can be used and there is no particular limitation. For example, the polymeric polyol includes polyester-based ones and polyether-based ones, and those based on polyether is more preferable compared to those based on polyester in that a thermoplastic polyurethane material with a high modulus of repulsion elasticity and excellent, low temperature properties can be synthesized. Examples of polyether polyol include polytetramethylene glycol and polypropylene glycol, and polytetramethylene glycol is particularly preferable regarding the modulus of repulsion elasticity and low temperature properties. In addition, the average molecular weight of the polymeric polyol is preferably 1,000 to 5,000, and in particular, for synthesizing a thermoplastic polyurethane material having a high repulsion elasticity, the average molecular weight is preferably 2,000 to 4,000. For the chain extender, those used in conventional technologies relating to thermoplastic polyurethane materials can be used suitably, and examples thereof include, but are not limited to, for example, 1,4-butylene glycol, 1,2-ethylene glycol, 1,3-butanediol, 1,6-hexanediol and 2,2-dimethyl-1,3-propanediol. The average molecular weight of these chain extenders is preferably 20 to 15,000. For the diisocyanate, those used in conventional technologies relating to thermoplastic polyurethane materials can be used suitably, and examples thereof include, but are not limited to, for example, aromatic diisocyanates such as 4,4'-diphenylmethane diisocyanate, 2,4-toluene diisocyanate and 2,6-toluene diisocyanate; and aliphatic diisocyanates such as hexamethylene diisocyanate. In the present invention, 4,4'-diphenylmethane diisocyanate, which is an aromatic diisocyanate, is particularly preferable. For the thermoplastic polyurethane material consisting of materials mentioned above, commercial products can be used suitably, and examples thereof include, for example, PANDEX T-8290, T-8295 and T8260 manufactured by DIC Bayer Polymer Ltd., and RESAMINE 2593 and 2597 manufactured by Dainichiseika Color & Chemicals Mfg. Co., Ltd.

(16) Various Copolymerized Rubbers

For rubbers other than the elastomers mentioned above, polybutadiene rubbers, polyisoprene rubbers, neoprene rubbers, nitrile rubbers, butyl rubbers, halogenated butyl rubbers, polyisobutylene rubbers, natural rubbers, silicone rubbers and the like are exemplified. One of these rubbers may be used singly, or two or more of them may be used in combination.

Among those exemplified hereinbefore, the thermoplastic resin (A) is preferably at least one resin selected from the group consisting of polycarbonates, olefin polymers and acid-modified objects thereof, styrene resins, chlorine-containing resins, ethylene-acrylic acid resins, ethylene-methacrylic acid resins and ionomer resins thereof, thermoplastic elastomers, and various copolymerized rubbers; more preferably at least one resin selected from the group consisting of polycarbonates, olefin polymers, polystyrene, acrylonitrile-butadiene-styrene copolymerized resins (ABS resins), and polyvinyl chloride; further preferably selected from polycarbonates, ethylene (co)polymers such as polyethylene, propylene (co)polymers such as polypropylene, poly(1-butene), poly(4-methyl-1-pentene), polyvinyl chloride, polystyrene and acrylonitrile-butadiene-styrene copolymers; and particularly preferably a polycarbonate, an ethylene (co)polymer or an propylene (co)polymer. When a polycarbonate is used as the thermoplastic resin (A), a molded product having a high mechanical strength and heat resistance is likely to be obtained. When an ethylene (co)polymer or a propylene (co)polymer is used as the thermoplastic resin (A), upon molding and processing of an electrically conductive resin composition, fuming, odor, and the like are little and the operation environment is satisfactory, which is preferable. Moreover, a satisfactory molded product with little scorch can be obtained. Note that the ethylene (co) polymer is excellent in low temperature properties and processability, and the propylene (co)polymer is excellent in heat resistance and stiffness.

1-2. Carbon Material (B)

In the electrically conductive resin composition, the carbon material (B) is a particulate carbon material having an average particle diameter of 500 nm or less or a fibrous carbon material having an average length of 1,000 μm or less.

Examples of the particulate carbon material include carbon black, graphite, activated charcoal, black lead and nanoporous carbon. Examples of the fibrous carbon material include carbon nanotubes, carbon nanofibers, carbon fibers (PAN-based, pitch-based) and carbon nanohorns. Among these, a carbon fiber or carbon black is preferable. One of these may be used singly, or two or more of them may be used in combination.

The carbon material (B) may be those obtained by heat treating an organic material. The organic material that is heat treated to be the carbon material is not particularly limited, but representative examples thereof include phenol resins, polyimide resins, polyamide resins, polyamideimide resins, polyacrylonitrile resins, polyaniline resins, phenol-formaldehyde resins, polyimidazole resins, polypyrrole resins, polybenzimidazole resins, melamine resins, pitch, brown coal, polycarbodiimide, biomass, proteins, humic acid and derivatives thereof.

Representative examples of carbon black include furnace black, channel black, acetylene black and thermal black, but channel black is preferable for achieving both electrical conductivity and mechanical, physical properties of the electrically conductive resin composition.

When the carbon material (B) is particulate, the dibutyl phthalate oil absorption of the carbon material (B) preferably ranges between 100 ml/100 g and 1,000 ml/100 g, more preferably ranges between 200 ml/100 g and 800 ml/100 g, and further preferably ranges between 300 ml/100 g and 600 ml/100 g. When the dibutyl phthalate oil absorption is within the range described above, an electrically conductive resin composition having a high electrical conductivity is obtained. The dibutyl phthalate oil absorption of the carbon material (B) can be measured in accordance with JIS K6217.

When the carbon material (B) is particulate, the average particle diameter of its primary particles (hereinafter, also simply referred to as the average particle diameter) in the electrically conductive resin composition is 500 nm or less, preferably 300 nm or less, more preferably 100 nm or less, and further preferably 50 nm or less. The lower limit of the average particle diameter is not particularly limited, but is normally 1 nm and preferably 3 nm. When the average particle diameter is within the range described above, an electrically conductive resin composition having a high electrical conductivity is obtained. The average particle diameter of primary particles of the carbon material (B) can be normally measured with electron microscopy (SEM). For example, the average particle diameter may be the average value of measured particle diameters of 10 primary particles in the field of view.

When the carbon material (B) is fibrous, the average length of fibers of the carbon material (B) in the electrically conductive resin composition is 1,000 μm or less, preferably 100 to 700 μm, and more preferably 200 to 500 μm. The aspect ratio (average length/average fiber diameter) of the carbon material (B) in the electrically conductive resin composition is, for example, 200 or less, preferably 10 to 100, and more preferably 20 to 80.

For the average length (or average fiber diameter) of fibers of the carbon material (B), the average length (or average fiber diameter) may be the average value of lengths (or fiber diameters) of, for example, tens to hundreds of fibers in the field of view, measured using optical microscopy or electron microscopy (SEM). The average length of the carbon material (B) in the electrically conductive resin composition can be adjusted according to, for example, the average length of a carbon material as the raw material, or molding conditions (type of the extruding machine, kneading temperature, or the like).

Commercial carbon materials can be used as the carbon material (B), and examples thereof include, for example, Tenax HT C217 (manufactured by Toho Tenax Co., Ltd.), Tenax HT C606 (manufactured by Toho Tenax Co., Ltd.), Tenax HT C503 (manufactured by Toho Tenax Co., Ltd.), PYROFIL TR06U (manufactured by Mitsubishi Chemical Corporation), PYROFIL TR06NE (manufactured by Mitsubishi Chemical Corporation), PYROFIL TR06Q (manufactured by Mitsubishi Chemical Corporation), KETJENBLACK EC-300J (manufactured by Lion Specialty Chemicals Co., Ltd.), KETJENBLACK EC-600JD (manufactured by Lion Specialty Chemicals Co., Ltd.), CARBON ECP (manufactured by Lion Specialty Chemicals Co., Ltd.), CARBON ECP600JD (manufactured by Lion Specialty Chemicals Co., Ltd.), DENKA BLACK (HS-100, FX-35, manufactured by Denka Company Limited.), TOKABLACK (#4300, #4400, #4500, #5500 manufactured by TOKAI CARBON CO., LTD.), and #3030B, #3040B, #3050B, #3230B, #3350B (all manufactured by Mitsubishi Chemical Corporation).

1-3. Modified Polyolefin Wax (C)

The modified polyolefin wax (C) is a resin different from the thermoplastic resin (A) described above.

When the carbon material (B) is incorporated to the thermoplastic resin (A), which is the base of the electrically conductive resin composition, the dispersibility of the thermoplastic resin (A) and the carbon material (B) may be poor, thereby not enabling a uniform kneading. In particular, when the amount of the carbon material (B) incorporated is large relative to the thermoplastic resin (A) or when the specific surface area (dibutyl phthalate oil absorption) of the carbon material (B) is big, dispersion is often hard due to viscosity increase upon kneading. As such, upon molding of an electrically conductive resin composition including the thermoplastic resin (A) and the carbon material (B), processability was deteriorated or uniformity of the molded product was insufficient, thereby often causing decline in electrical conductivity, deterioration of appearance, decline in heat resistance or mechanical strength, or decline in flexibility (elongation).

According to considerations of the present inventors, it has been found that incorporation of the modified polyolefin wax (C), more preferably, a maleic anhydride-modified product, an air oxidation product or a styrene-modified product of a polyolefin wax upon kneading of the thermoplastic resin (A) and the carbon material (B) has an effect of improving balance among the electrical conductivity, appearance, heat resistance, mechanical strength, flexibility and processability.

Although the mechanism behind this is not clear in detail, it is assumed that if a maleic anhydride group, or a carboxy group, carbonyl group or hydroxy group derived from the air oxidation product is present in the molecular chain of the modified polyolefin wax (C), it has an excellent affinity with a polar group (for example, a carboxy group, carbonyl group or hydroxy group) present on the surface of the carbon material (B), thereby reducing friction of the thermoplastic resin (A) and the carbon material (B) upon kneading and elevating the flowability of the electrically conductive resin composition. As the flowability of the electrically conductive resin composition is elevated, the processability is elevated and the appearance of the molded product is also improved. In addition, it is assumed that due to the elevation of the flowability of the electrically conductive resin composition, destruction of the carbon material (B) or aggregated particle structure thereof can be suppressed, thereby suppressing decline in the electrical conductivity.

Moreover, when a styrene structure is present in the molecular chain of the modified polyolefin wax (C), an excellent affinity is brought about due to its electrical interaction with a double bond present in the molecule of the carbon material (B). As a result, similar effects as in the case of a maleic anhydride-modified product or an air oxidation product of the polyolefin wax are obtained.

1-3-1. Physical Properties of Modified Polyolefin Wax (C)

It is preferable that the modified polyolefin wax (C) satisfy any one or more of the requirements (i) to (iv) described below:

(i) The number average molecular weight (Mn) of the modified polyolefin wax (C) in terms of polystyrene, measured by gel permeation chromatography (GPC), preferably ranges from 300 to 10,000. The upper limit of the number average molecular weight (Mn) is more preferably 8,000, further preferably 5,000, particularly preferably 4,000 and further preferably 3,000. In addition, the lower limit of the number average molecular weight (Mn) is more preferably 400, further preferably 500, particularly preferably 600, and further preferably 700. When the number average molecular weight is within the range described above, the dispersibility of the carbon material (B) in the electrically conductive resin composition is enhanced, thereby achieving an excellent electrical conductivity, appearance and mechanical strength. Moreover, the processability of the electrically conductive resin composition also becomes satisfactory.

(ii) The ratio between the weight average molecular weight and the number average molecular weight (Mw/Mn) of the modified polyolefin wax (C), measured by gel permeation chromatography (GPC), is preferably 7.0 or less. The ratio is more preferably 5.0 or less and further preferably 3.0 or less. When the Mw/Mn is included within the range described above, the amount of low molecular weight components, which cause deterioration of physical properties, is small, thereby achieving an excellent appearance, heat resistance and mechanical strength.

(iii) The softening point of the modified polyolefin wax (C) measured in accordance with JIS K2207 preferably ranges from 70 to 170° C. The upper limit of the softening point is more preferably 160° C., further preferably 150° C., and particularly preferably 145° C. In addition, the lower limit is more preferably 80° C., further preferably 90° C., particularly preferably 95° C., and most preferably 105° C. When the softening point is at the upper limit described above or less, the obtained electrically conductive resin composition has an excellent processability, appearance, heat resistance and mechanical strength. When the softening point is at the lower limit described above or more, in the obtained electrically conductive resin composition, the bleed out of the modified polyolefin wax (C) is suppressed, which is preferable.

(iv) The density of the modified polyolefin wax (C), measured in accordance with JIS K7112 and with density gradient tube method, preferably ranges from 830 to 1,200 kg/m$^3$. The density is more preferably 860 to 1,150 kg/m$^3$, further preferably 890 to 1,100 kg/m$^3$, particularly preferably 895 to 1,050 kg/m$^3$, and further preferably 895 to 1,000 kg/m$^3$. When the density is within the range described above, the dispersibility of the carbon material (B) is enhanced, thereby achieving an excellent electrical conductivity, appearance and mechanical strength. Moreover, the processability of the electrically conductive resin composition also becomes satisfactory.

Among others, out of the requirements (i) to (iv), it is more preferable to satisfy the requirement (iii).

Furthermore, the difference between the density of the thermoplastic resin (A) and the density of the modified polyolefin wax (C) is preferably less than 50 kg/m$^3$, further preferably less than 30 kg/m$^3$, and particularly preferably less than 15 kg/m$^3$. When the density difference is within the range described above, an excellent processability, appearance, heat resistance and mechanical strength are achieved. It is believed that this is because substances having similar densities tend to easily intermingle with each other. That is, it is believed that since the compatibility between the thermoplastic resin (A) and the modified polyolefin wax (C) is high, the dispersibility of the carbon material (B) covered with the modified polyolefin wax (C) is consequently enhanced and the processability is thus elevated. Along with this, it is believed that since the bleed out from the thermoplastic resin (A) due to the modified polyolefin wax (C) is suppressed, the appearance, heat resistance and mechanical strength are achieved all.

1-3-2. Structure of Modified Polyolefin Wax (C)

The modified polyolefin wax (C) is preferably an unsaturated carboxylic acid-modified product (for example, maleic anhydride-modified product), an air oxidation product or a styrene-modified product of a homopolymer or a copolymer of at least one selected from ethylene and $C_{3-12}$ α-olefins. More preferably, the modified polyolefin wax (C) is an unsaturated carboxylic acid-modified product (for example, maleic anhydride-modified product), an air oxidation product or a styrene-modified product of a copolymer of ethylene and at least one α-olefin selected from $C_{3-12}$ α-olefins.

Examples of $C_{3-12}$ α-olefins include $C_3$ propylene, $C_4$ 1-butene, $C_5$ 1-pentene, $C_6$ 1-hexene and 4-methyl-1-pentene, and $C_8$ 1-octene, and it is more preferably propylene, 1-butene, 1-hexene or 4-methyl-1-pentene.

The modified polyolefin wax (C) is, as previously mentioned, obtained by modifying with an unsaturated carboxylic acid or a derivative thereof or styrenes, or air-oxidizing an unmodified propylene wax such as a homopolymer or a copolymer of at least one selected from ethylene and $C_{3-12}$ α-olefins. Hereinafter, the unmodified polyolefin wax and a production method thereof will be described first, and then, the modified polyolefin wax obtained by modifying it will be described.

(Unmodified Polyolefin Wax)

Hereinafter, as specific examples of the unmodified polyolefin wax, polyethylene waxes, polypropylene waxes and 4-methyl-1-pentene waxes will be described, but the unmodified polyolefin wax is not limited to them.

Polyethylene Wax

When the unmodified polyolefin wax is a polyethylene wax, preferred examples of the polyethylene wax are described in, for example, Japanese Patent Application Laid-Open No. 2009-144146 and the like, which will be briefly described hereinafter.

When the unmodified polyolefin wax is a polyethylene wax, it is preferably an ethylene homopolymer or a copolymer of ethylene and a $C_{3-12}$ α-olefin. Specific examples of the ethylene homopolymer include high density polyethylene waxes, medium density polyethylene waxes, low density polyethylene waxes and linear low density polyethylene waxes.

On the other hand, when the polyethylene wax is a copolymer of ethylene and a $C_{3-12}$ α-olefin, the amount of structural units derived from ethylene (a) is preferably 87.0 to 99.9 mass %, more preferably 90.0 to 99.9 mass %, further preferably 93.0 to 99.9 mass %, and particularly preferably 93.0 to 98.5 mass %. Meanwhile, the amount of structural units derived from the α-olefin having 3 or more carbon atoms (b) is preferably 0.1 to 13.0 mass %, preferably 0.1 to 10.0 mass %, further preferably 0.1 to 7.0 mass %, and particularly preferably 1.5 to 7.0 mass %. Note that (a)+(b)=100 mass %. The content ratio of structural units in the olefin polymer described above can be determined through analysis of the $^{13}$C-NMR spectrum.

Examples of the $C_{3-12}$ α-olefin include linear or branched α-olefins such as propylene, 1-butene, 1-pentene, 3-methyl-1-butene, 1-hexene, 4-methyl-1-pentene, 3-methyl-1-pentene, 1-octene, 1-decene and 1-dodecene, and it is preferably propylene, 1-butene, 1-hexene, 4-methyl-1-pentene or 1-octene, further preferably a $C_{3-8}$ α-olefin, particularly preferably propylene or 1-butene, and most preferably 1-butene. When ethylene and propylene or 1-butene are copolymerized, the modified polyolefin wax (C) tends to become hard, thereby reducing stickiness, and therefore, the surface properties of a molded product become satisfactory. In addition, this is preferable from the viewpoint of enhancing the mechanical strength or heat resistance. The reason by which the modified polyolefin wax (C) becomes hard and the stickiness is reduced as such is not clear, but propylene and 1-butene efficiently lower the melting point even with a small amount of copolymerization compared to other α-olefins, and the crystallinity therefore tends to become higher when compared at the same melting point, which is assumed to be a contributing factor for the above. One α-olefin may be used singly, or two or more α-olefins may be used in combination.

The polyethylene wax described above is suitably used, in particular, when the thermoplastic resin (A) is a polyethylene resin. When these are combined, the compatibility between the thermoplastic resin (A) and the modified polyolefin wax (C) is enhanced, and balance among the appearance, processability, mechanical strength and heat resistance of the molded product to be obtained becomes satisfactory.

Polypropylene Wax

The unmodified polyolefin wax may be a polypropylene wax. The polypropylene wax may be a homopolymer of propylene or a copolymer mainly composed of propylene obtained by copolymerizing propylene and, as necessary, another monomer in the presence of a stereospecific catalyst, or may be those obtained by thermally decomposing polypropylene with a high molecular weight. In addition, the polypropylene wax may be those purified by using methods such as solvent fractionation, in which fractionation is performed based on the difference in solubilities in a solvent, or molecular distillation, in which fraction collection is performed based on the difference in boiling points. The polypropylene wax may be a propylene homopolymer, a copolymer of propylene and ethylene, or a copolymer of propylene and a $C_{4-12}$ α-olefin.

When ethylene is copolymerized with a propylene polymer, structural units derived from propylene may be 60 to 99.5 mol %. The amount of structural units derived from propylene is preferably 80 to 99 mol %, more preferably 90 to 98.5 mol %, and further preferably 95 to 98 mol %. By using the propylene (co)polymer described above, an electrically conductive resin composition having an excellent balance among the appearance, mechanical strength and heat resistance can be obtained.

When a $C_{4-12}$ α-olefin is copolymerized for the propylene (co)polymer, examples of the $C_{4-12}$ α-olefin include linear or branched α-olefins such as 1-butene, 1-pentene, 3-methyl-1-butene, 1-hexene, 4-methyl-1-pentene, 3-methyl-1-pentene, 1-octene, 1-decene and 1-dodecene. Among these, 1-butene is particularly preferable.

When the propylene (co)polymer described above is a propylene-α-olefin copolymer, the amount of structural units derived from propylene (a') is preferably 53 to 87 mass %, more preferably 58 to 85 mass %, further preferably 64 to 81 mass %, and particularly preferably 69 to 77 mass %.

Meanwhile, the amount of structural units derived from the α-olefin having 4 or more carbon atoms (b') is preferably 13 to 47 mass %, more preferably 15 to 42 mass %, further preferably 19 to 36 mass %, and particularly preferably 23 to 31 mass %. Note that (a')+(b')=100 mass %.

When the composition of the propylene-α-olefin copolymer is within the range described above, an electrically conductive resin composition with an excellent appearance can be obtained. It is believed that the reason behind this is that it takes time for the compatibilizer to crystallize, and therefore, a long time during which the electrically conductive resin composition can flow in a metal mold or during a cooling step can be ensured, and as a result, the surface properties of the molded product to be obtained become satisfactory. In addition, the heat resistance and mechanical strength also tend to be excellent.

The polypropylene wax described above is suitably used, in particular, when the thermoplastic resin (A) is a polypropylene resin. When these are combined, the compatibility between the thermoplastic resin (A) and the modified polyolefin wax (C) is enhanced, and balance among the appearance, processability, mechanical strength and heat resistance of the molded product to be obtained becomes satisfactory.

4-Methyl-1-Pentene Wax

The unmodified polyolefin wax may be those obtained by thermally decomposing a 4-methyl-1-pentene-α-olefin copolymer disclosed in WO2011/055803, or a 4-methyl-1-pentene polymer as shown in Japanese Patent Application Laid-Open No. 2015-028187.

(Method of Producing Unmodified Polyolefin Wax)

The unmodified polyolefin wax such as the polyethylene wax or the polypropylene wax mentioned above may be those obtained by directly polymerizing ethylene, an α-olefin or the like, or may be those obtained by thermally decomposing a copolymer with a high molecular weight. When thermal decomposition is performed, it is preferably performed at 300 to 450° C. for 5 minutes to 10 hours. In this case, unsaturated terminals are present in the unmodified polyolefin wax. Specifically, when the number of vinylidene groups, measured by $^1$H-NMR, is 0.5 to 5 per 1,000 carbon atoms, compatibilizing effects to the carbon material (B) are enhanced, which is particularly preferable. In addition, the unmodified polyolefin wax may be purified by methods such as solvent fractionation, in which fractionation is performed based on the difference in solubilities in a solvent, or distillation. Furthermore, the unmodified polyolefin wax may consist of a single polymer, or may be two or more polymers that have been mixed.

When the polyolefin wax is obtained by directly polymerizing ethylene or an α-olefin, the polyolefin wax can be produced by various known production methods such as a production method in which ethylene or an α-olefin is polymerized with a Ziegler-Natta catalyst or a metallocene catalyst.

(Modified Polyolefin Wax (C))

The number average molecular weight (Mn) and the limiting viscosity [η] of the modified polyolefin wax (C) tend to be lowered when the polymerization temperature is raised or the hydrogen concentration is raised upon the polymerization of the unmodified polyolefin wax, and therefore, they can be controlled to be within the range described above. Alternatively, they can be regulated with the amount of an organic aluminumoxy compound and/or an ionized ionic compound used, which are used as a cocatalyst. Furthermore, they can also be regulated through purification after the polymerization.

The content of structural units derived from ethylene or each α-olefin can be controlled by adjusting the amount to be incorporated upon the polymerization, as well as through catalyst species, polymerization temperature or the like.

The Mw/Mn of the modified polyolefin wax (C) can be controlled through catalyst species, polymerization temperature or the like upon the polymerization of the unmodified polyolefin wax. In general, a Ziegler-Natta catalyst or a metallocene catalyst is used for the polymerization, but in order to set the Mw/Mn within a suitable range, it is preferable to use a metallocene catalyst. In addition, the Mw/Mn can be set within a suitable range by purifying the modified polyolefin wax (C) with methods such as solvent fractionation, in which fractionation is performed based on the difference in solubilities in a solvent, or distillation.

The softening point of the modified polyolefin wax (C) can be adjusted through the composition of ethylene or an α-olefin upon the polymerization of the unmodified polyolefin wax, and for example, in the case of a copolymer of ethylene and an α-olefin, the softening point tends to be lowered as the content of the α-olefin increases. It can also be controlled through catalyst species, polymerization temperature or the like. Furthermore, it can also be regulated through purification after the polymerization.

The density of the modified polyolefin wax (C) can be regulated through the composition of ethylene or an α-olefin upon the polymerization of the unmodified polyolefin wax, as well as through the polymerization temperature and the hydrogen concentration upon the polymerization.

Air Oxidation Product (Oxidation-Modified Product) of Unmodified Polyolefin Wax

An air oxidation product of the unmodified polyolefin wax is obtained by contacting the unmodified polyolefin wax to be a raw material in the molten state with oxygen or oxygen-containing gas under stirring, thereby oxidation-modifying the unmodified polyolefin wax. The unmodified polyolefin wax is made to be in the molten state at a temperature of, normally, 130 to 200° C. and preferably 140 to 170° C.

Upon the oxidation modification, the unmodified polyolefin wax to be a raw material in the molten state is contacted with oxygen or oxygen-containing gas under stirring to perform oxidation reaction, and the term "oxygen or oxygen-containing gas" is used to include pure oxygen (oxygen obtained through normal, liquid air fractionation or electrolysis of water, and this may include other components at the level of impurities), a mixed gas of pure oxygen and another gas, for example, air, and ozone.

As a method of contacting the unmodified polyolefin wax to be a raw material with oxygen or the like, in particular, a method is preferable in which oxygen-containing gas is continuously fed from the lower part of a reactor to allow to contact with the unmodified polyolefin wax. In addition, in this case, it is preferable to feed the oxygen-containing gas so that oxygen is fed in an amount equivalent to 1.0 to 8.0 NL/min relative to 1 kg of the raw material mixture.

Examples of the air oxidation product of the unmodified polyolefin wax include oxidized paraffin (manufactured by NIPPON SEIRO CO., LTD.) or the like.

Graft-Modified Product of Unmodified Polyolefin Wax

A graft-modified product of the unmodified polyolefin wax may be a modified polyolefin wax obtained by, for example, acid-graft-modifying the unmodified polyolefin wax with an unsaturated carboxylic acid or a derivative thereof (hereinafter, also referred to as an acid-modified polyolefin wax (C')), a styrene-modified polyolefin wax obtained through graft-modification with styrenes, a modified polyolefin wax obtained through graft-modification with a mixture of unsaturated carboxylic acid or a derivative thereof and styrenes, a sulfonic acid salt-modified polyolefin wax obtained through modification with a sulfonic acid salt, or the like. They can be prepared by conventionally known methods. For example, they are obtained by melt kneading (1) the unmodified polyolefin wax to be a raw material and (2) an unsaturated carboxylic acid or a derivative thereof, styrenes, or a sulfonic acid salt in the presence of (3) a polymerization initiator such as organic peroxides, or by kneading a solution in which (1) the unmodified polyolefin wax to be a raw material and (2) an unsaturated carboxylic acid or a derivative thereof, styrenes, or a sulfonic acid salt are dissolved in an organic solvent in the presence of (3) a polymerization initiator such as organic peroxides.

For the melt kneading, for example, an autoclave, Henschel mixer, V-blender, tumbler blender, ribbon blender, single screw extruding machine, multi-screw extruding machine, kneader, Banbury mixer or the like is used. Among these, when an apparatus excellent in the batch melt kneading performance such as an autoclave is used, a polyolefin wax can be obtained in which more homogeneous dispersion and reaction of all components have been achieved. When compared to continuous processing, batch processing allows the retention time to be readily adjusted, and the modification rate and the modification efficiency are also enhanced relatively readily because a long retention time can be ensured; therefore, the batch processing is the most preferable aspect in the present invention.

When the acid-modified polyolefin wax (C') is a wax graft-modified with an unsaturated carboxylic acid or a derivative thereof and styrenes, the ratio of graft amount, "(unsaturated carboxylic acid or derivative thereof)/(styrenes)" (unit: mass ratio) is preferably 0.01 to 1, more preferably 0.03 to 0.8, and particularly preferably 0.05 to 0.6. When the ratio of graft amount is 0.01 or more, a sufficient interaction of the unsaturated carboxylic acid or a derivative thereof to the surface of the carbon material (B) is readily obtained, and therefore, the impact resistance is readily elevated. Moreover, when the ratio of graft amount is 1 or less, the melt viscosity of the acid-modified polyolefin wax (C') does not become too high, and therefore, the processability is hardly impaired.

(Acid Modification)

Examples of the unsaturated carboxylic acid or a derivative thereof used in the acid modification include: acrylic acid esters such as methyl acrylate, ethyl acrylate, butyl acrylate, sec-butyl acrylate, isobutyl acrylate, propyl acrylate, isopropyl acrylate, 2-octyl acrylate, dodecyl acrylate, stearyl acrylate, hexyl acrylate, isohexyl acrylate, phenyl acrylate, 2-chlorophenyl acrylate, diethylaminoethyl acrylate, 3-methoxybutyl acrylate, diethyleneglycol ethoxyl acrylate and 2,2,2-trifluoroethyl acrylate; methacrylic acid esters such as methyl methacrylate, ethyl methacrylate, butyl methacrylate, sec-butyl methacrylate, isobutyl methacrylate, propyl methacrylate, isopropyl methacrylate, 2-octyl methacrylate, dodecyl methacrylate, stearyl methacrylate, stearyl methacrylate, hexyl methacrylate, decyl methacrylate, phenyl methacrylate, 2-chlorohexyl methacrylate, diethylaminoethyl methacrylate, 2-hexylethyl methacrylate and 2,2,2-trifluoroethyl methacrylate; maleic acid esters such as ethyl maleate, propyl maleate, butyl maleate, diethyl maleate, dipropyl maleate and dibutyl maleate; fumaric acid esters such as ethyl fumarate, butyl fumarate and dibutyl fumarate; dicarboxylic acids such as maleic acid, fumaric acid, itaconic acid, crotonic acid, nadic acid and methylhexahydrophthalic acid; and anhydrides such as maleic anhydride, itaconic anhydride, citraconic anhydride, allyl succinic anhydride, glutaconic anhydride and nadic anhydride. Among these, maleic anhydride is preferable. Maleic anhydride has a relatively high reactivity with the unmodified polyolefin wax, which is a raw material, and rarely undergoes a big structural change due to polymerization or the like and tends to be stable as a basic structure per se. Accordingly, when the modified polyolefin wax (C) is a polyolefin wax that has been maleic anhydride-modified, the polyolefin wax that has been maleic anhydride-modified, added to an electrically conductive resin composition, can keep a stable condition even under a high temperature environment during molding and processing, and efficiently act on the surface of the carbon material (B). As a result, it is believed that the electrically conductive resin composition will have a satisfactory balance among the appearance, heat resistance, processability and mechanical strength.

The acid-modified polyolefin wax (C') may be a commercial product. Examples of a commercially available acid-modified polyolefin wax (B1') include DIACARNA-PA30 (manufactured by Mitsubishi Chemical Corporation), and Hi-WAX acid-treated types, NP0555A, 2203A and 1105A (manufactured by Mitsui Chemicals, Inc.).

(Styrene Modification)

Examples of the styrenes used for styrene modification include styrene, α-methyl styrene, o-methyl styrene, p-methyl styrene, m-methyl styrene, p-chlorostyrene, m-chlorostyrene and p-chloromethyl styrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

(Sulfonic Acid Salt Modification)

Moreover, the unmodified polyolefin wax or the graft-modified polyolefin wax described above may be further modified with a sulfonic acid salt. In this case, the modification amount of sulfonic acid is preferably 0.1 to 100 millimole and further preferably 5 to 50 millimole relative to 1 g of the polymer (the unmodified polyolefin wax or the graft-modified polyolefin wax described above). When the modification amount with sulfonic acid salt is within the range described above, the dispersibility of the carbon material (B) gets better, and the mechanical strength of a molded product obtained from the electrically conductive resin composition is elevated.

(Acid Number)

When the modified polyolefin wax (C) is either of an oxidation-modified product of the unmodified polyolefin (an air oxidation product of the unmodified polyolefin wax), an acid-modified product of the unmodified polyolefin (acid-modified polyolefin wax (C')), or a sulfonic acid salt-modified product of the unmodified polyolefin, the acid number of the modified polyolefin wax (C) (JIS K0070) is 1 to 100 mgKOH/g, preferably 10 to 95 mgKOH/g, more preferably 20 to 90 mgKOH/g, and particularly preferably 30 to 85 mgKOH/g. Here, the acid number refers to the number of milligrams of potassium hydroxide required for neutralization of 1 g of a sample.

When the acid number of the modified polyolefin wax (C) is within the range described above, the electrically conductive resin composition has an excellent electrical conductivity, appearance, processability, heat resistance and mechanical strength. Although the mechanism behind this is not clear in detail, it is believed that when the acid number is within the range described above, the affinity between the carbon material (B) and the modified polyolefin wax (C) is appropriately enhanced, and the adaptability with the thermoplastic resin (A) is also maintained; as a result, the uniformity of the entire system is enhanced and the dispersibility of the carbon material (B) becomes satisfactory, and while the appearance and processability become satisfactory, the electrical conductivity and the appearance are also improved. Due to this, it is believed that even though a wax with a low molecular weight is added, the heat resistance and mechanical strength of the electrically conductive resin composition are enhanced.

Furthermore, in order to obtain an electrically conductive resin composition particularly having an excellent processability and appearance, the upper limit of the acid number of the modified polyolefin wax (C) is preferably 60 mgKOH/g, more preferably 50 mgKOH/g, further preferably 40 mgKOH/g, and particularly preferably 30 mgKOH/g. It is believed that when the acid number is within the range described above, the affinity between the carbon material (B) and the modified polyolefin wax (C) is not too high, and therefore, the melt viscosity of the electrically conductive resin composition is lowered and the flowability is enhanced.

On the other hand, in order to obtain an electrically conductive resin composition having an excellent heat resistance and mechanical strength, the lower limit of the acid number of the modified polyolefin wax (C) is preferably 40 mgKOH/g, more preferably 50 mgKOH/g, further preferably 60 mgKOH/g, and particularly preferably 70 mgKOH/g. It is believed that this is because the affinity between the carbon material (B) and the modified polyolefin wax (C) is enhanced when the acid number is within the range described above.

The acid number of the modified polyolefin wax (C) can be adjusted by one or more of the air oxidation amount, acid modification amount, and sulfonic acid salt modification amount.

(Styrene Amount)

When the modified polyolefin wax (C) is a styrene-modified product (a styrene-modified polyolefin wax), the content of styrenes (the styrene content) is preferably 5 to 80 parts by mass, more preferably 10 to 70 parts by mass, more preferably 15 to 60 parts by mass, and particularly preferably 20 to 50 parts by mass based on 100 parts by mass of the modified polyolefin wax (C). When the content of styrenes in the modified polyolefin wax (C) is within the range described above, the compatibility between the modified polyolefin wax (C) and the carbon material (B) becomes satisfactory and an excessive interaction causing increased viscosity or the like is also suppressed, and therefore, an excellent balance among the processability, appearance, heat resistance and mechanical strength is achieved. The content of styrenes can be calculated from the amount of styrenes added upon the modification.

The styrene amount of the modified polyolefin wax (C) can be adjusted by the styrene modification amount.

1-3-3. Form of Modified Polyolefin Wax (C)

The modified polyolefin wax (C) may be a solid such as powder, tablet and block, or may be dispersed or dissolved in water or a solvent. A method of dissolving or dispersing the compatibilizer in water or an organic solvent is not particularly limited, but examples of the method include a method of dissolving or dispersing the compatibilizer in water or an organic solvent under stirring, or a method in which a mixture of the compatibilizer and water or an organic solvent is gradually cooled from an elevated temperature or a state of complete or incomplete dissolution to provide fine particles under stirring. Examples of the method of providing fine particles include, for example, a method in which the solvent composition is set in advance to cause precipitation at 60 to 100° C., the average cooling rate within this range is regulated to be 1 to 20° C./hour, preferably 2 to 10° C./hour, and cooling is conducted to allow precipitation. Moreover, the modified polyolefin wax (C) may be dissolved only in a good solvent, and after finishing precipitation in the good solvent, a poor solvent may be added to further perform precipitation. Alternatively, water or the organic solvent is once removed, and then, the resultant may be dissolved and dispersed in an arbitrary solvent for use. The compatibilizer may of course be those in a state where the compatibilizer is dispersed in various water or organic solvents, or those in which a part or all of the resin is dissolved.

1-4. Optional Components

To the electrically conductive resin composition of the present invention, to the extent where the objects and effects of the present invention are not impaired, optional components, for example, flame retardants such as brominated bisphenols, brominated epoxy resins, brominated polystyrenes, brominated polycarbonates, triphenyl phosphate, phosphonic amide and red phosphorus; flame retardant auxiliaries such as antimony trioxide and sodium antimonate; thermal stabilizers such as phosphoric acid esters and phosphorous acid esters; oxidation inhibitors such as hindered phenol; heat resistant agents; weathering agents; photostabilizers; mold releasing agents; flowability modifying agents; coloring agents; lubricants; antistatic agents; nucleating agents; plasticizing agents; or blowing agents may be further incorporated as necessary. The content of optional components in the electrically conductive resin composition is preferably 30 parts by mass or less, more preferably 20 parts by mass or less, particularly preferably 10 parts by mass or less, and further preferably less than 5 parts by mass based on 100 parts by mass of the total of the thermoplastic resin (A) and the carbon material (B).

2. Method of Producing Electrically Conductive Resin Composition

The electrically conductive resin composition of the present invention can be produced utilizing various arbitrary methods. For example, a method is used appropriately of mixing the thermoplastic resin (A), the carbon material (B), the modified polyolefin wax (C) and other optional components simultaneously or in an arbitrary order with a tumbler, V-blender, nauta mixer, Banbury mixer, kneading roller, single or twin screw extruding machine, or the like.

In order to enhance the affinity with the modified polyolefin wax (C) to enhance the dispersibility of the carbon material (B) in the thermoplastic resin (A), the modified polyolefin wax (C) can be impregnated or attached to the carbon material (B) by mixing the modified polyolefin wax (C) that has been melted or the modified polyolefin wax (C) that has been dispersed or dissolved in water or various solvents with the carbon material (B), and removing the water or various solvents when used.

Alternatively, the electrically conductive resin composition of the present invention may be produced via providing a masterbatch including the thermoplastic resin (A), the carbon material (B) and the modified polyolefin wax (C) and melt kneading the masterbatch, the thermoplastic resin (A) and, as necessary, the carbon material (B) or the modified polyolefin wax (C).

In the masterbatch, the thermoplastic resin (A), the carbon material (B) and the modified polyolefin wax (C) are included. In the electrically conductive resin composition of the present invention, there are some cases where a uniform dispersion of the carbon material (B) in the thermoplastic resin (A) is hard. Accordingly, after preparing a masterbatch including the thermoplastic resin (A), the carbon material (B) and the modified polyolefin wax (C), the masterbatch and the thermoplastic resin (A) are further mixed, thereby achieving a uniform dispersion. In addition, the coverage factor of the modified polyolefin wax (C) to the carbon material (B) is elevated and the carbon material (B) becomes unlikely to protrude from the surface of a molded product. Therefore, the surface glossiness of the molded product is enhanced and the aesthetics and designable properties of the molded product are improved. Moreover, the elevation of the coverage factor of the modified polyolefin wax (C) to the carbon material (B) also improves the mechanical strength and heat resistance.

The content mass ratio of the carbon material (B) and the modified polyolefin wax (C), B/C, in the masterbatch is for example 0.1 to 30, preferably 1 to 25, and more preferably 2 to 20. When the content mass ratio B/C is 30 or less, since the proportion of the carbon material (B) is not relatively too high, particles of the carbon material (B) or the aggregated structure is unlikely to be destroyed upon production of the masterbatch, and reduction in the electrical conductivity upon completion of the electrically conductive resin composition is readily suppressed. In addition, when the content mass ratio B/C is 0.1 or more, since the proportion of the modified polyolefin wax (C) is not relatively too high, the melt viscosity is not lowered too much and the masterbatch is readily produced. Furthermore, since the amount of the carbon material (B) is not too small, a high electrical conductivity is readily obtained.

Moreover, in the masterbatch, the optional components previously mentioned may be included. The masterbatch can be produced by mixing all components with a tumbler, V-blender, nauta mixer, Banbury mixer, kneading roller, single or twin screw extruding machine, or the like.

3. Applications of Electrically Conductive Resin Composition

The electrically conductive resin composition of the present invention can be molded to be used as a molded product. A method of molding is not particularly limited, but examples thereof include injection molding, extrusion molding and compression molding, and injection molding is preferable from the viewpoint of designable properties and moldability.

The electrically conductive resin composition of the present invention can be molded into a molded product for a wide range of applications from home appliances to industrial goods. Examples of the molded product include electrical components, electronic components, automotive components, machine mechanical components, food containers, films, sheets and fibers. More specifically, for example, examples thereof include business and OA equipment such as printers, personal computers, word processors, keyboards, PDA (personal digital assistants), telephones, cell phones, smartphones, tablet terminals, WiFi routers, facsimile machines, copying machines, ECR (electronic cash registers), electronic calculators, electronic notebooks, electronic dictionaries, cards, holders and stationery; household electrical appliances such as laundry machines, refrigerators, cleaners, microwave ovens, lighting equipment, game machines, irons and kotatsu (Japanese foot warmer); AV equipment such as TV, VTR, video cameras, digital cameras, single lens reflex cameras, mobile audio terminals, radio cassette recorders, tape recorders, mini discs, CD players, speakers and liquid crystal displays; and electrical/electronic components and telecommunication equipment such as connectors, relays, condensers, switches, printed circuit boards, coil bobbins, semiconductor sealing materials, electrical wires, cables, transformers, deflecting yokes, distribution boards and clocks.

In addition, examples thereof include materials for automobiles, vehicles, ships, aircraft and construction, such as seats (including paddings and outer materials), belts, ceiling coverings, convertible tops, arm rests, door trims, rear package trays, carpets, mats, sun visors, wheel covers, tires, mattress covers, air bags, insulation materials, hangers, hand straps, electrical wire-sheathing materials, electrical insulating materials, paints, coating materials, overlaying materials, floor materials, corner walls, deck panels, covers, plywood, ceiling boards, partition plates, side walls, carpets, wall papers, wall covering materials, exterior materials, interior materials, roofing materials, sound insulating panels, thermal insulating panels and window materials; and daily and sporting goods, such as clothing, curtains, sheets, plywood, laminated fiber boards, carpets, entrance mats, sheets, buckets, hoses, containers, glasses, bags, cases, goggles, skis, rackets, tents and musical instruments.

Furthermore, examples thereof include bottles for shampoo, detergent or the like, seasoning bottles for edible oils, soy sauce or the like, beverage bottles for mineral water, juice or the like, heat resistant food containers such as lunch boxes and bowls for chawanmushi (Japanese steamed egg custard), tableware such as dishes and chopsticks, various other food containers, packaging films and packaging bags.

EXAMPLES

The present invention will be described in detail based on Examples, but the present invention is not limited to the following Examples.

1. Thermoplastic Resin (A)

(Thermoplastic Resin (A1))

As a thermoplastic resin (A1), ULTZEX 20200J manufactured by Prime Polymer Co., Ltd. (LLDPE, MFR: 18.5 g/10 min, density: 918 kg/m$^3$, Vicat softening point: 94° C., melting point: 120° C., glass transition temperature: −80° C., bending elastic modulus: 200 MPa) was used. Note that each of these physical properties was measured under the following conditions.

<MFR>

Measurement was performed in accordance with ISO 1133 at 190° C. and with a load of 2.16 kg.

<Density>

Measurement was performed in accordance with ISO 1183.

<Vicat Softening Point>

Measurement was performed in accordance with ISO 306.

<Melting Point and Glass Transition Temperature>

Measurement was performed using a differential scanning calorimetry (DSC).

<Bending Elastic Modulus>

Measurement was performed in accordance with ISO 178.

(Thermoplastic Resin (A2))

As a thermoplastic resin (A2), an aromatic polycarbonate resin (manufactured by TEIJIN LIMITED, Panlite L-1225Y, 5% weight loss temperature: 480° C., MVR: 11 cm$^3$/10 min) was used.

2. Carbon Material (B)

(Particulate Carbon Material (B1))

As a particulate carbon material (B1), KETJENBLACK EC300J manufactured by Lion Specialty Chemicals Co., Ltd. (dibutyl phthalate oil absorption: 365 ml/100 g, BET specific surface area: 800 m$^2$/g, average particle diameter of primary particles: 40 nm) was used. Note that each of these physical properties was measured under the following conditions.

(Particulate Carbon Material (B2))

As a particulate carbon material (B2), KETJENBLACK EC600J manufactured by Lion Specialty Chemicals Co., Ltd. (dibutyl phthalate oil absorption: 495 ml/100 g, BET specific surface area: 1,400 m$^2$/g, average particle diameter of primary particles: 30 nm) was used. Note that each of these physical properties was measured under the following conditions.

<Dibutyl Phthalate Oil Absorption>

Measurement was performed in accordance with JIS K6217.

<BET Specific Surface Area>

Measurement was performed in accordance with JIS Z8830.

(Fibrous Carbon Material (B3))

As a fibrous carbon material (B3), carbon fiber Tenax HT C217 manufactured by Toho Tenax Co., Ltd. was used.

3. Modified Polyolefin Wax (C)

As a modified polyolefin wax (C), W1 and W2 shown in Table 1 were used. In addition, as examples not corresponding to the modified polyolefin wax (C), an unmodified olefin wax and calcium stearate (melting point: 149° C. (softening point unmeasurable), manufactured by SAKAI CHEMICAL INDUSTRY CO., LTD.) were used as W3 and W4, respectively. Methods of producing W1 to W3 will be mentioned later in the section of Production Examples. Furthermore, results of analysis using the following methods are shown in Table 1.

<Composition>

The amount of each structural unit (the composition ratio of ethylene and propylene) constituting the modified polyolefin waxes W1 and W2, as well as the unmodified polyolefin wax W3, was determined through analysis of the $^{13}$C-NMR spectrum measured under the following conditions.

<Measurement Conditions of $^{13}$C-NMR>

Apparatus: AVANCE III cryo-500 nuclear magnetic resonance apparatus manufactured by Bruker BioSpin Corp.

Nucleus measured: $^{13}$C (125 MHz)

Measurement mode: single pulse proton broadband decoupling

Pulse width: 45° (5.00 μsec)

Number of points: 64 k

Measurement range: 250 ppm (−55 to 195 ppm)

Repetition time: 5.5 seconds

Cumulative number: 128

Measurement solvent: ortho-dichlorobenzene/benzene-d$_6$ (4/1 (volume ratio))

Sample concentration: 60 mg/0.6 mL

Measurement temperature: 120° C.

Window function: exponential (BF: 1.0 Hz)

Chemical shift reference: δδ signal 29.73 ppm

<Number Average Molecular Weight (Mn) and Molecular Weight Distribution (Mw/Mn)>

The number average molecular weight Mn was determined by GPC measurement. The measurement was performed under the following conditions. Then, the number average molecular weight (Mn) and the weight average molecular weight (Mw) were determined from a calibration curve with a commercial monodispersed standard polystyrene to calculate the Mw/Mn.

Apparatus: Gel permeation chromatograph Alliance GPC2000 (manufactured by Waters Corporation)

Solvent: o-dichlorobenzene

Columns: TSKgel GMH6-HT×2 and TSKgel GMH6-HTL column×2 (both manufactured by Tosoh Corporation)

Flow rate: 1.0 ml/min

Sample: 0.15 mg/mL o-dichlorobenzene solution

Temperature: 140° C.

<Softening Point>

Measurement was performed in accordance with JIS K2207.

TABLE 1

| Item | Test method | Unit | Modified polyolefin wax (C) | | Comparative | |
| --- | --- | --- | --- | --- | --- | --- |
| | | | W1 | W2 | W3 | W4 |
| Structure | — | — | Maleated C2/C3 copolymer | Styrene-modified C2/C3 copolymer | Unmodified C2/C3 copolymer | Calcium stearate |
| Composition | $^{13}$C-NMR | — | C2: 96 mass % C3: 4 mass % | C2: 96 mass % C3: 4 mass % | C2: 96 mass % C3: 4 mass % | |
| Mn (in terms of PS) | GPC method | — | 1700 | — | 630 | — |
| Mw/Mn | GPC method | — | 2.4 | — | 1.9 | — |
| Density | JIS K7112 | kg/m$^3$ | 920 | 997 | 922 | — |
| Acid number | JIS K0070 | mg-KOH/g | 60 | 0 | 0 | — |
| Softening point | JIS K2207 | ° C. | 110 | 105 | 113 | Unmeasurable |
| Melt viscosity @200° C. | B-type viscometer | mPa·s | — | 190 | 10 | — |
| Melt viscosity @160° C. | B-type viscometer | mPa·s | — | 500 | 15 | — |
| Melt viscosity @140° C. | B-type viscometer | mPa·s | 150 | 1100 | 20 | — |

<Density>

Measurement was performed in accordance with JIS K7112.

<Acid Number>

Measurement was performed in accordance with JIS K0070. Note that an acid number of 11 mgKOH/g is converted into a content rate of polar groups of 1 mass %.

Production Example 1

(Production of Unmodified Polyolefin Wax W3)

(1) Preparation of Catalyst

In an autoclave made of glass with an internal volume of 1.5 liters, 25 g of commercial anhydrous magnesium chloride was suspended in 500 ml of hexane. While keeping this at 30° C. under stirring, 92 ml of ethanol was added dropwise over 1 hour, and further allowed to react for 1 hour. After the reaction ended, 93 ml of diethylaluminum monochloride was added dropwise over 1 hour, and further allowed to react for 1 hour. After the reaction ended, 90 ml of titanium tetrachloride was added dropwise, the temperature of the reaction vessel was elevated to 80° C., and the reaction was allowed for 1 hour. After the reaction ended, the solid part was washed with hexane by decantation until free titanium was not detected. The titanium concentration of the resulting hexane suspension was quantified by titration and the suspension was subjected to the following experiment.

(2) Production of Ethylene-Propylene Copolymer (Unmodified Polyolefin Wax W3)

In an autoclave made of stainless steel with an internal volume of 2 liters, sufficiently purged with nitrogen, 930 ml of hexane and 70 ml of propylene were charged, and hydrogen was introduced until reaching 20.0 kg/cm$^2$ (gauge pressure). Subsequently, after the temperature in the system was elevated to 170° C., polymerization was initiated by pressing in, with ethylene, 0.1 millimole of triethylaluminum, 0.4 millimole of ethylaluminum sesquichloride, and the hexane suspension of the obtained solid described above such that the amount of the titanium component is 0.008 millimole in terms of atoms.

Then, the total pressure was kept at 40 kg/cm$^2$ (gauge pressure) by continuously feeding only ethylene, and the polymerization was performed at 170° C. for 40 minutes.

The polymerization was stopped by adding a small amount of ethanol into the system, and then, unreacted ethylene and propylene were purged. The resulting polymer solution was dried overnight at 100° C. under reduced pressure to obtain an ethylene-propylene copolymer.

Production Example 2

(Production of Modified Polyolefin Wax W1)

To a reactor made of glass, 500 g of the prepared, unmodified polyolefin wax (W3) described above was charged and melted at 160° C. under a nitrogen atmosphere. Next, 30 g of maleic anhydride and 3 g of di-t-butyl peroxide (hereinafter, abbreviated as DTBPO) were continuously fed into the reaction system described above (temperature: 160° C.) over 5 hours. Then, after allowing the thermal reaction for further 1 hour, the resultant was, while remaining in the molten state, subjected to deaeration treatment for 0.5 hours under 10 mmHg vacuum to remove volatile matters, and then cooled to obtain a modified polyolefin wax W1. Physical properties are shown in Table 1.

Production Example 3

(Production of Modified Polyolefin Wax W2)

To a reactor made of glass, 300 g of the prepared, unmodified olefin wax (W3) described above was charged and melted at 160° C. under a nitrogen atmosphere. Next, 450 g of styrene and 19 g of di-t-butyl peroxide (hereinafter, abbreviated as DTBPO) were continuously fed into the reaction system described above (temperature: 160° C.) over 6 hours. Then, after allowing the thermal reaction for further 1 hour, the resultant was, while remaining in the molten state, subjected to deaeration treatment for 0.5 hours under 10 mmHg vacuum to remove volatile matters, and then cooled to obtain a modified polyolefin wax W2. Physical properties are shown in Table 1.

(Production of Electrically Conductive Resin Compositions)

Example 1

To LABO PLASTOMILL manufactured by Toyo Seiki Seisaku-sho, Ltd. (a twin-screw batchwise melt kneading apparatus) heated to 150° C., 2.50 g of the carbon material (B) and 1.55 g of the modified polyolefin wax (C) relative to 47.50 g of the thermoplastic resin (A) were charged and kneaded over 10 minutes to obtain an electrically conductive resin composition. The compounding ratio of the raw materials is shown in Table 2.

Example 2

With a kneader manufactured by MORIYAMA (a twin-screw batchwise melt kneading apparatus) heated to 150° C., 60 g of the thermoplastic resin (A), 2,160 g of the carbon material (B) and 180 g of the modified polyolefin wax (C) were kneaded over 15 minutes, and the resultant was then granulated with a ruder manufactured by MORIYAMA (a single screw extruding machine) to obtain a masterbatch (thermoplastic resin (A)/carbon material (B)/modified polyolefin wax (C)=1/36/3 (mass ratio)). Then, to LABO PLASTOMILL manufactured by Toyo Seiki Seisaku-sho, Ltd. (a twin-screw batchwise melt kneading apparatus) heated to 150° C., 47.43 g of the thermoplastic resin (A), 1.34 g of the modified polyolefin wax (C) and 2.78 g of the masterbatch described above were charged and kneaded over 10 minutes to obtain an electrically conductive resin composition. The compounding ratio of the raw materials is as shown in Table 2.

Examples 3 to 9 and Comparative Examples 2 to 9

Electrically conductive resin compositions were obtained in the same way as Example 1 except that the compounding ratio of the raw materials was changed to those shown in Table 2. Note that, in Examples 6 and 7, as well as Comparative Examples 7 to 9, the kneading temperature was set to be 280° C.

Comparative Example 1

An electrically conductive resin composition was obtained in the same way as Example 1 except that the modified polyolefin wax (C) was not added.

(Evaluation of Electrically Conductive Resin Compositions)

Each of the electrically conductive resin compositions obtained in Examples 1 to 10 and Comparative Examples 1 to 9 was press-molded under conditions of preheating at 210° C. for 5 minutes, pressurization at 200° C. for 2 minutes and cooling at 20° C. for 4 minutes to obtain a sheet-like molded product having a thickness of 2 mm. Using the sheet-like molded product obtained, evaluation was conducted by the following methods on the average particle diameter of the particulate carbon material (B1) or (B2), or the average length of the fibrous carbon material (B3) in the electrically conductive resin composition, and the flowability (MFR), tensile strength, bending strength and electrical conductivity of the electrically conductive resin composition. The results are shown in Table 2.

<Average Particle Diameter>

For the electrically conductive resin composition including the particulate carbon material (B1) or (B2), particle diameters of 10 primary particles of the carbon material (B1) or (B2) in the field of view were measured using electron microscopy (SEM), and their average value was defined to be the average particle diameter.

<Average Length>

For the electrically conductive resin composition including the fibrous carbon material (B3), lengths of 365 fibers of the carbon material (B3) in the field of view were measured using optical microscopy or electron microscopy (SEM), and their average value was defined to be the average length. The average length was 266 μm for the resin composition obtained in Example 7, and 222 μm for the resin composition obtained in Comparative Example 9. Using the same method, the average fiber diameter was measured and it was 7 μm for both resin compositions. That is, the aspect ratio of the carbon material (B3) in the electrically conductive resin composition was 38 for the resin composition of Example 7, and 32 for the resin composition of Comparative Example 9.

<Flowability (MFR)>

The sheet-like molded product was cut into a predetermined size to produce a sample piece, and measurement was performed in accordance with JIS K7210 under conditions of 230° C. and 10 kgf.

<Flowability (MVR)>

Measurement was performed in accordance with ISO 1133 under conditions of 300° C. and 1.2 kg.

<Tensile Strength>

The sheet-like molded product was cut to produce a dumbbell test piece (entire length: 50 mm, width of grip section: 10 mm, width of parallel section: 5 mm, and thickness: 2 mm). Using this dumbbell test piece, the tensile strength, tensile elongation and tensile elastic modulus were measured under conditions of a distance between chucks of 30 mm and a testing rate of 50 mm/min.

<Bending Strength>

The sheet-like molded product was cut into a predetermined size to produce a test piece, and the bending strength and bending elastic modulus were measured based on JIS K7171 under conditions of a testing rate of 5 mm/min and a bending span of 32 mm.

<Electrical Conductivity (Volume Resistivity; Guarded-Electrode System)>

The sheet-like molded product was cut into a predetermined size to produce a test piece, and measurement was performed in accordance with ASTM D257 under conditions of an applied voltage of 50 V or 100 V.

<Electrical Conductivity (Volume Resistivity; Four-Probe Method)>

The sheet-like molded product was cut into a predetermined size to produce a test piece, and measurement was performed in accordance with JIS K7194 under conditions of an applied current of 1 μA.

<Appearance>

The appearance of the sheet-like molded product was visually evaluated, where those having a smooth surface were evaluated as A and those having an unsmooth surface were evaluated as B.

Evaluation results of Examples 1 to 10 are shown in Table 2 and evaluation results of Comparative Examples 1 to 9 are shown in Table 3.

TABLE 2

| Item | | | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Composition | Thermoplastic resin (A) | A1 | LLDPE | Parts by mass | 95 | 95 | 85 | 95 | 85 | | | | | |
| | | A2 | Polycarbonate | Parts by mass | | | | | | 90 | 90 | 92 | 91 | 90 |
| | Carbon material (B) | B1 | KETJENBLACK | Parts by mass | 5 | 5 | 15 | 5 | 15 | 10 | | | | |
| | | B2 | KETJENBLACK | Parts by mass | | | | | | | | 10 | 10 | 10 |
| | | B3 | Carbon fiber | Parts by mass | | | | | | | 10 | | | |
| | Modified polyolefin wax (C) | W1 | | Parts by mass | 3.1 | 3.1 | 3.1 | | | 3.1 | 3.1 | 1.1 | 2.1 | 3.1 |
| | | W2 | | Parts by mass | | | | 3.1 | 3.1 | | | | | |
| | Comparative | W3 | | Parts by mass | | | | | | | | | | |
| | | W4 | | Parts by mass | | | | | | | | | | |
| Evaluation | Average particle diameter (average primary particle diameter) of carbon material (B1) or (B2) | | | nm | 40 | 40 | 40 | 40 | 40 | 40 | — | 40 | 40 | 30 |
| | Average length of carbon material (B3) | | | μm | — | — | — | — | — | — | 266 | — | — | — |
| | Flowability | MFR | 190° C., 2.16 kg | g/10 min | 1.04 | 1.01 | 0.66 | 1.10 | 0.73 | — | — | — | — | — |
| | | MVR | 300° C., 1.2 kg | cm³/10 min | | | | | | 8.2 | 12.9 | 7.1 | 7.7 | 10.9 |
| | Tensile test | | Strength | MPa | 13.1 | 13.5 | 10.9 | 13.4 | 10.8 | 90.2 | 140.0 | 93.1 | 91.0 | 132.0 |
| | | | Elongation | % | 50 | 51 | 40 | 52 | 43 | 4 | 10 | 3 | 4 | 8 |
| | | | Elastic modulus | MPa | 326 | 327 | 370 | 293 | 378 | 6010 | 6500 | 5900 | 5850 | 6350 |
| | Bending test | | Strength | MPa | 14.2 | 14.4 | 17.2 | 14.0 | 16.8 | 151 | 156 | 137 | 142 | 150 |
| | | | Elastic modulus | MPa | 408 | 410 | 488 | 422 | 490 | 7150 | 7900 | 6910 | 6940 | 7770 |
| | Electrical conductivity (volume resistivity) | | Four-probe method | Ω·cm | 1.0E+07 | 1.2E+07 | 9.1E+00 | 8.9E+06 | 9.0E+00 | 1.0E+03 | 3.6E+03 | 3.2E+03 | 1.4E+03 | 8.9E+02 |
| | | | Guarded-electrode system 50 V | Ω·cm | 8.9E+06 | 9.2E+06 | | 7.0E+06 | | | | | | |
| | | | 100 V | Ω·cm | | | | | | | | | | |
| | Appearance | | | — | A | A | A | A | A | A | A | A | A | A |

TABLE 3

| | Item | | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| Composition | Thermoplastic resin (A) | A1 LLDPE | Parts by mass | 95 | 85 | 95 | 85 | 95 | 85 | | | |
| | | A2 Polycarbonate | Parts by mass | | | | | | | 90 | 90 | 90 |
| | Carbon material (B) | B1 KETJENBLACK | Parts by mass | 5 | 15 | | | | | | | |
| | | B2 KETJENBLACK | Parts by mass | | | 5 | 15 | 5 | 15 | 10 | 10 | |
| | | B3 Carbon fiber | Parts by mass | | | | | | | | | 10 |
| | Modified polyolefin wax (C) | W1 | Parts by mass | | | | | | | | | |
| | | W2 | Parts by mass | | | | | | | | | |
| | Comparative | W3 | Parts by mass | | | 3.1 | 3.1 | 3.1 | 3.1 | | 3.1 | |
| | | W4 | Parts by mass | | | | | | | | | |
| Evaluation | Average particle diameter (average primary particle diameter) of carbon material (B1) | | nm | 40 | 40 | 40 | 40 | 40 | 40 | 40 | 40 | |
| | Average length of carbon material (B3) | | μm | | | | | | | | | 222 |
| | Flowability | MFR 190° C., 2.16 kg | g/10 min | 0.87 | 0.43 | 1.00 | 0.74 | 1.12 | 2.01 | 5.6 | 11.3 | 9.1 |
| | | MVR 300° C., 1.2 kg | cm³/10 min | — | — | — | — | — | — | — | — | — |
| | Tensile test | Strength | MPa | 12.9 | 9.5 | 13.5 | 11.0 | 13.3 | 10.0 | 97.2 | 84.0 | 117.0 |
| | | Elongation | % | 54 | 47 | 52 | 44 | 589 | 137 | 7 | 5 | 4 |
| | | Elastic modulus | MPa | 306 | 355 | 305 | 389 | 289 | 397 | 5840 | 5710 | 5650 |
| | Bending test | Strength | MPa | 13.5 | 16.3 | 13.0 | 14.4 | 12.9 | 14.5 | 160 | 132 | 175 |
| | | Elastic modulus | MPa | 400 | 485 | 325 | 413 | 327 | 424 | 6990 | 6870 | 6560 |
| | Electrical conductivity (volume resistivity) | Four-probe method | Ω·cm | 4.4E+07 | 3.0E+01 | 2.1E+07 | 2.4E+01 | 4.0E+07 | 2.8E+01 | 9.4E+03 | 1.4E+04 | 3.2E+04 |
| | | Guarded-electrode system 50 V | Ω·cm | 3.2E+07 | | 1.2E+07 | | 3.0E+07 | | | | |
| | | 100 V | Ω·cm | | | | | | | | | |
| | Appearance | | — | A | A | A | A | A | A | A | A | A |

As shown in Tables 2 and 3, it can be seen that electrically conductive resin compositions of Examples 1 to 5 (or Examples 6 to 10) including a predetermined amount of the modified polyolefin wax (C) relative to the total of the thermoplastic resin (A) and the carbon material (B) have lower volume resistivities and higher electrical conductivities compared to electrically conductive resin compositions of Comparative Examples 1 and 2 (or Comparative Examples 7 and 9) not including the modified polyolefin wax (C), and Comparative Examples 3 to 6 (or Comparative Example 8) including comparative compounds without impairing the mechanical strength (tensile strength and elastic modulus, and bending strength and elastic modulus). In particular, it can be seen that when the fibrous carbon material (B3) is included, since the inclusion of the modified polyolefin wax (C) makes the fibers unlikely to be ruptured (since the average length is unlikely to become short) during the production of the resin composition, the electrical conductivity is unlikely to be impaired (contrast between Example 7 and Comparative Example 9).

Furthermore, it can be seen that the electrically conductive resin composition of Example 2, which is obtained by producing the masterbatch including a part of the thermoplastic resin (A), the carbon material (B) and the modified polyolefin wax (C), and then kneading the masterbatch with the remainder of the thermoplastic resin (A), can have a further lower volume resistivity value compared to the electrically conductive resin composition of Example 1, which is obtained by kneading the thermoplastic resin (A), the carbon material (B) and the modified polyolefin wax (C) all at once. It is assumed that this is because in the electrically conductive resin composition of Example 2, the dispersibility of the carbon material (B) to the thermoplastic resin (A) has been further enhanced compared to the electrically conductive resin composition of Example 1.

It can also be seen that the mechanical strength and electrical conductivity are further readily enhanced as the content of the modified polyolefin wax (C) gets larger (contrast among Examples 6, 9 and 10).

It can also be seen that the mechanical strength and electrical conductivity are further readily enhanced by using the styrene-modified polyolefin wax W2 rather than using the acid-modified polyolefin wax W1 (contrast between Examples 1 and 4, and contrast between Examples 3 and 5).

It can also be seen that the fibrous carbon material (B3) further readily enhances the mechanical strength and electrical conductivity compared to the particulate carbon material (B1) (contrast between Examples 6 and 7).

It can also be seen that the particulate carbon material (B2), which has a smaller average particle diameter, further readily enhances the mechanical strength and electrical conductivity (contrast between Examples 6 and 10).

The present application claims priority to Japanese Patent Application No. 2017-037301 filed on Feb. 28, 2017, the content of which is incorporated herein in its entirety.

INDUSTRIAL APPLICABILITY

The electrically conductive resin composition of the present invention can achieve both electrical conductivity and mechanical strength satisfactorily, and therefore, it can be broadly applied to various applications requiring a high electrical conductivity and mechanical strength.

The invention claimed is:

1. An electrically conductive resin composition, comprising 75 to 99 parts by mass of a thermoplastic resin (A) and 1 to 25 parts by mass of a carbon material (B), and also comprising more than 1 part by mass and 10 parts by mass or less of a modified polyolefin wax (C) based on 100 parts by mass of the total of the thermoplastic resin (A) and the carbon material (B), wherein
  the carbon material (B) is a particulate carbon material having an average particle diameter of 500 nm or less or a fibrous carbon material having an average length of 1,000 μm or less,
  the modified polyolefin wax (C) is a maleic anhydride-modified product, an air oxidation product or a styrene-modified product of a copolymer of ethylene and at least one α-olefin selected from $C_{3-12}$ α-olefins, and,
  the number average molecular weight (Mn) of the modified polyolefin wax (C), as measured by gel permeation chromatography (GPC), ranges from 300 to 3,000.

2. The electrically conductive resin composition according to claim 1, wherein the modified polyolefin wax (C) satisfies the following (iii):
  (iii) a softening point measured in accordance with JIS K2207 ranges from 70 to 170° C.

3. The electrically conductive resin composition according to claim 1, wherein the modified polyolefin wax (C) is a maleic anhydride-modified product or the air oxidation product of the copolymer of ethylene and at least one α-olefin selected from $C_{3-12}$ α-olefins, and
  wherein an acid number of the modified polyolefin wax (C) ranges from 1 to 100 mgKOH/g.

4. The electrically conductive resin composition according to claim 1, wherein the modified polyolefin wax (C) is the styrene-modified product of the copolymer of ethylene and at least one α-olefin selected from $C_{3-12}$ α-olefins, and
  wherein a styrene amount of the modified polyolefin wax (C) ranges from 5 to 80 mass %.

5. The electrically conductive resin composition according to claim 1, wherein a dibutyl phthalate oil absorption of the carbon material (B) is 100 ml/100 g to 1,000 ml/100 g.

6. The electrically conductive resin composition according to claim 1, wherein the thermoplastic resin (A) is an ethylene (co)polymer or a propylene (co)polymer.

7. The electrically conductive resin composition according to claim 1, wherein the thermoplastic resin (A) is a polycarbonate resin.

8. A method of producing the electrically conductive resin composition according to claim 1, comprising:
  providing a masterbatch comprising the thermoplastic resin (A), the carbon material (B) and the modified polyolefin wax (C); and
  melt kneading the masterbatch and the thermoplastic resin (A).

9. A molded product obtained from the electrically conductive resin composition according to claim 1.

10. The molded product according to claim 9, wherein the molded product is an electromagnetic wave shielding member for Office automation equipment.

* * * * *